US012811731B2

(12) United States Patent
Qiao et al.

(10) Patent No.: US 12,811,731 B2
(45) Date of Patent: Nov. 24, 2026

(54) FREQUENCY HOPPING FOR REDUCED CAPABILITY (REDCAP) USER EQUIPMENTS

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 390 days.

(21) Appl. No.: 18/272,764

(22) PCT Filed: Jan. 16, 2021

(86) PCT No.: PCT/CN2021/072350

§ 371 (c)(1),
(2) Date: Jul. 17, 2023

(87) PCT Pub. No.: WO2022/151453

PCT Pub. Date: Jul. 21, 2022

(65) Prior Publication Data

US 2024/0187151 A1 Jun. 6, 2024

(51) Int. Cl.
*H04L 5/00* (2006.01)
*H04W 8/22* (2009.01)
*H04W 72/0457* (2023.01)

(52) U.S. Cl.
CPC ............. *H04L 5/0012* (2013.01); *H04W 8/22* (2013.01); *H04W 72/0457* (2023.01)

(58) Field of Classification Search
CPC ............... H04L 5/0012; H04L 5/0003; H04W 72/0457; H04W 8/22
See application file for complete search history.

(56) References Cited

U.S. PATENT DOCUMENTS

2017/0238313 A1* 8/2017 Wang .................... H04W 72/21 370/329
2020/0244489 A1 7/2020 Rahman et al.
2020/0350950 A1* 11/2020 Yao ...................... H04B 1/7143
(Continued)

FOREIGN PATENT DOCUMENTS

CN 101222268 A 7/2008
CN 106464296 A 2/2017
CN 109600833 A 4/2019
(Continued)

OTHER PUBLICATIONS

European Patent Office, Extended European Search Report Issued in Application No. 21918656.6, Feb. 19, 2024, (21p).
(Continued)

*Primary Examiner* — Ian N Moore
*Assistant Examiner* — Latresa A McCallum
(74) *Attorney, Agent, or Firm* — Arch & Lake LLP; Hao Tan; Shen Wang

(57) ABSTRACT

Frequency hopping control methods and apparatuses are provided. In one frequency hopping control method, a user equipment (UE) determines a type of a UE and determines one or more frequency hopping parameters according to the type of the UE. Furthermore, the UE may perform frequency hopping according to the determined one or more frequency hopping parameters.

29 Claims, 7 Drawing Sheets

(56) References Cited

U.S. PATENT DOCUMENTS

2023/0345230 A1* 10/2023 Yu ......................... H04L 5/0051

FOREIGN PATENT DOCUMENTS

| | | | | |
|---|---|---|---|---|
| CN | 110447288 | A | 11/2019 | |
| CN | 111313929 | A | 6/2020 | |
| CN | 111406378 | A | 7/2020 | |
| CN | 111727644 | A | 9/2020 | |
| EP | 3281296 | A1 | 2/2018 | |
| EP | 4080957 | A1 * | 10/2022 | ............. H04J 13/18 |
| WO | 2019149896 | A1 | 8/2019 | |
| WO | 2020032646 | A1 | 2/2020 | |

OTHER PUBLICATIONS

Ericsson: "Potential UE complexity reduction features for RedCap," R1-2008837, 3GPP TSG-RAN WG1 Meeting #103-e, Online, Oct. 26-Nov. 13, 2020, (62p).

Huawei et al., "Identification and access restriction of REDCAP UE," R2-2007345, 3GPP TSG RAN WG2 #111-e Online, Aug. 17-28, 2020, (3p).

3GPP TSG RAN, "NR; Physical layer procedures for data (Release 16)," 3GPP TS 38.214, vol. RAN WG1, No. V16.4.0, XP51999688A, Jan. 8, 2021, (169p).

3GPP TSG RAN,"NR; Physical layer procedures for control (Release 16)," 3GPP TS 38.213, vol. RAN WG1, No. V16.4.0, XP51999687A, Jan. 8, 2021, (181p).

Intellectual property India, Office Action Issued in Application No. 202317054812, Mar. 13, 2024 with English translation, (6p).

ISA State Intellectual Property Office of the People's Republic of China, Written Opinion of the International Searching Authority Issued in Application No. PCT/CN2021/072350, Sep. 26, 2021, (7p).

International Search Report issued in PCT Application No. PCT/CN2021/072350, dated Sep. 26, 2021 with English translation, (4p).

State Intellectual Property Office of the People's Republic of China, Office Action and Search Report Issued in Application No. 2021800001731, Mar. 13, 2025, (Submitted with Machine Translation), (16p).

Huawei, HiSilicon, "Identification and access restriction of RedCap UE", R2-2009934, 3GPP TSG-RAN WG2 Meeting #112-e, Electronic, Nov. 2-13, 2020, (5p).

Ericsson, "Potential UE complexity reduction features for RedCap", 3GPP TSG-RAN WG1 Meeting #103-e, R1-2007529, Online, Oct. 26-Nov. 13, 2020, (62p).

* cited by examiner

FREQUENCY HOPPING FOR REDUCED CAPABILITY (REDCAP) USER EQUIPMENTS

CROSS-REFERENCE TO RELATED APPLICATION

The present application is the U.S. National Stage of International Application No. PCT/CN2021/072350, filed on Jan. 16, 2021, the entire contents of which are incorporated herein by reference for all purposes.

TECHNICAL FIELD

The present disclosure relates to the field of communication technologies, and in particular, to frequency hopping control methods and apparatuses.

BACKGROUND

In communication technologies, MTC (Machine Type Communication) and NB-IoT (Narrow Band Internet of things) technologies have been proposed to meet the requirements of IoT (Internet of things) connectivity in LTE (Long Term Evolution) 4G (the 4th generation mobile communication technology).

In order to further meet the low speed and strict latency requirements of IoT devices, a redcap (Reduced capability) UE (User Equipment) has been proposed in 5G (the 5th generation mobile communication technology). Because a system bandwidth of the redcap UE is small, when the redcap UE performs frequency hopping, it may cause the redcap UE to hop out of the system bandwidth and cannot work.

Therefore, how to avoid a bandwidth of a redcap UE hopping out of a system has become an urgent problem to be solved.

SUMMARY

Embodiments of the present disclosure provide frequency hopping control methods and apparatuses for solving the above problem.

According to a first aspect of the present disclosure, it is provided a frequency hopping control method, which is performed by a user equipment (UE), including: determining a type of a UE; determining one or more frequency hopping parameters according to the type of the UE; and performing frequency hopping according to the one or more frequency hopping parameters.

According to a second aspect of the present disclosure, it is provided a frequency hopping control method, which is performed by a base station, including: determining a type of a UE; determining one or more frequency hopping parameters of the UE according to the type of the UE; and providing a frequency hopping service for the UE according to the one or more frequency hopping parameters of the UE.

According to a third aspect of the present disclosure, it is provided a frequency hopping control apparatus, which is performed by a base station, including: a transceiver; a memory; a processor, connected to the transceiver and the memory, respectively, and configured to control radio signal transmission and reception of the transceiver by executing computer-executable instructions on the memory, and is configured to: determine a type of UE; determine one or more frequency hopping parameters of the UE according to the type of the UE; and provide a frequency hopping service of the UE according to the one or more frequency hopping parameters.

Additional aspects and advantages of the present disclosure will be given in part in the following description, and some will become apparent from the following description, or will be learned through the practice of the present disclosure.

BRIEF DESCRIPTION OF DRAWINGS

The above-mentioned and/or additional aspects and advantages of the present disclosure will be apparent and easily understood from the following description of embodiments taken in conjunction with accompanying drawings, in which.

DETAILED DESCRIPTION

Figure 1:
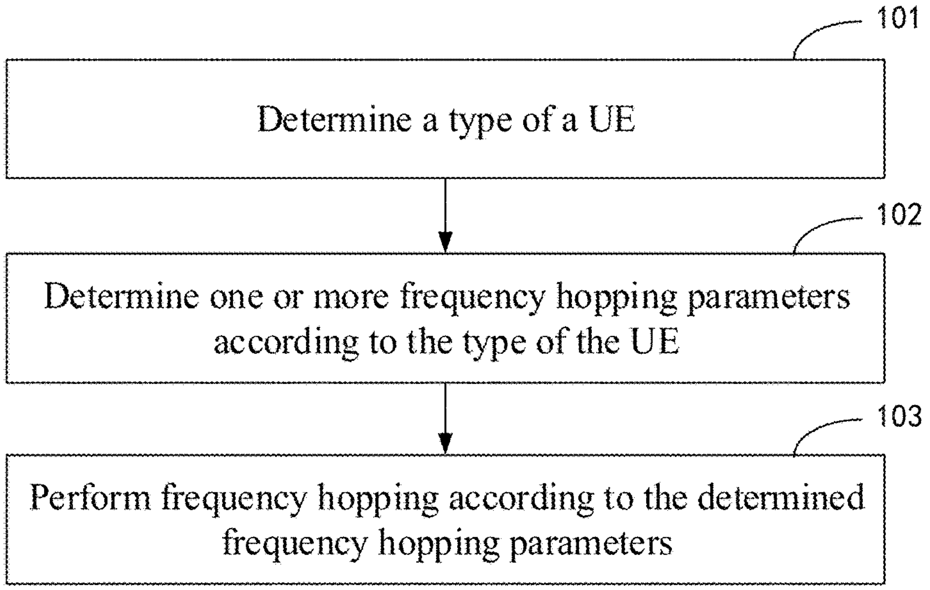
FIG. 1 is a schematic flowchart of a frequency hopping method according to an embodiment of the present disclosure.

Hereinafter, embodiments of the present disclosure will be described in detail, examples of which are illustrated in the accompanying drawings, where the same or similar reference numerals from beginning to end indicate the same or similar components or components having the same or similar functions throughout. Embodiments described below by referring to the accompanying drawings are exemplary and are intended to explain the present disclosure, and should not be construed as limiting the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In related technologies, because a system bandwidth of the redcap UE is small, when the redcap UE performs frequency hopping, it may cause the redcap UE to hop out of the system bandwidth and cannot work. Therefore, how to avoid a redcap UE from hopping out of system bandwidth during frequency hopping has become an urgent problem.

In response to this problem, embodiments of the present disclosure provide frequency hopping control methods and apparatuses.

FIG. 1 is a schematic flowchart of a frequency hopping method according to an embodiment of the present disclosure; which is executed by a UE. In this embodiment, a same initial uplink BWP (bandwidth part) is configured for both a redcap UE and a non-reduced capability UE (non-redcap UE). As mentioned above, if a frequency hopping mechanism used by a redcap UE and a non-redcap UE is the same, there may be a situation where the redcap UE hops out of a system bandwidth of redcap UE at a certain frequency hopping. Therefore, in the embodiment of the present disclosure, under the premise that the frequency hopping mechanism used by the redcap UE and the non-redcap UE is the same, frequency hopping parameters can be adjusted according to a type of UE to avoid the situation where the redcap UE hops out of its system bandwidth range.

In the embodiment of the present disclosure, after determining frequency parameters such as a frequency hopping offset value (RB (resource block) offset list/value), a number of hops, and a FH (frequency hopping) time domain granularity, UE can perform frequency hopping according to the determined frequency hopping parameters. It should be noted that in the embodiments of the present disclosure, frequency hopping parameters include the frequency hopping offset value, the number of hops, the FH time domain granularity, and so on. The frequency hopping offset value is used to determine a start position of each hop; the number of hops is used to achieve a higher frequency diversity gain by configuring multiple frequency domain positions; and the FH time domain granularity is used to expand basic granularities of time-domain frequency hopping, which can support cross-slot joint channel estimation, or reduce DMRS (Demodulation Reference Signal) density for a low mobility or stationary UE.

As shown in FIG. 1, the frequency hopping control method includes the following steps.

At step 101, a type of a UE is determined.

In the embodiments of the present disclosure, the types of UE include a redcap (Reduced capability) UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR. In the LTE 4G system, two major technologies, MTC and NB-IoT, have been proposed to support IoT services. These two major technologies are mainly aimed at scenarios such as low rate and high latency, for example, meter reading and environmental monitoring. At present, NB-IoT can only support rates of up to a few hundred kilobytes (k), while MTC can only support rates of up to a few megabytes (M). But at the same time, on the other hand, with the continuous development of the IoT business, for example, popularization of video surveillance, smart home, wearable devices, industrial sensor monitoring and other business, these business typically require rates ranging from tens to 100M, and also have relatively strict latency requirements. Therefore, MTC and NB-IoT technologies in LTE are difficult to meet these requirements. In this embodiment, this new type of UE is collectively referred to as a Reduced Capability UE, i.e., a redcap UE, while a current normal terminal is referred to as a non-redcap UE in the embodiment of the present disclosure.

In an embodiment of the present disclosure, a redcap UE typically has the following features:

Low cost, low complexity

A certain degree of coverage enhancement

Power savings.

Due to the current NR (new radio) being designed for high-end terminals such as high-speed and low latency, the current design cannot meet the above requirements for the redcap UE. Therefore, it is necessary to modify the current NR system to meet the requirements of the redcap UE. For example, in order to meet the requirements of low cost and low complexity, a bandwidth of the redcap UE can be limited, for example, to 10 MHz or 20 MHz, or the number of receiving antennas for the redcap UE can be limited. For power savings, a possible optimization direction is to reduce the processing complexity of user equipment, such as only receiving a PDCCH (Physical Downlink Control Channel) in a slot, and entering a micro-sleep state at other symbols in the same slot. For a certain degree of coverage enhancement, multiple repeated transmissions (repetitions) can be performed on each channel, reduce bit rates, etc.

In an embodiment of the present disclosure, the type of the UE can be determined based on a size of a bandwidth. In an embodiment of the present disclosure, a base station can obtain a bandwidth of the UE, and the type of the UE can be determined according to a bandwidth size of the UE, that is, a redcap UE or a non-redcap UE. In other embodiments of the present disclosure, two types of UE can further be distinguished based on a physical random access channel (PRACH).

Figure 2:
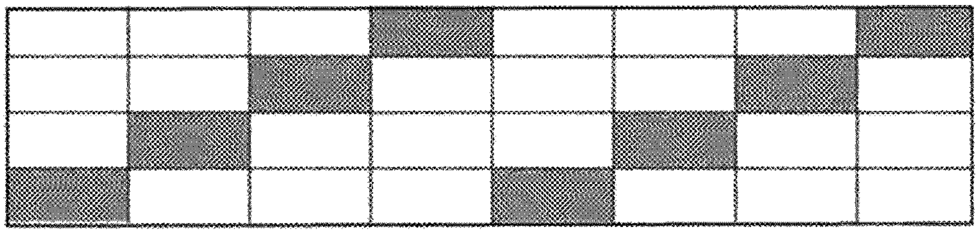
FIG. 2 is a schematic diagram of a frequency hopping mode according to an embodiment of the present disclosure.

As shown in FIG. 2, in an embodiment of the present disclosure, the frequency hopping offset value is used to determine a start position of each hop. The number of hops can be understood as hop numbers in the frequency hopping: for example, if Message3 (msg3) is repeatedly transmitted 8 times, the FH time domain granularity is 1 slot, and the number of hops can be 4, a frequency hopping mode can be shown in FIG. 2. That is to say, during a repetition process, the transmission of msg3 has 4 different frequency domain positions (as shown in the grey part of FIG. 2).

At step 102, one or more frequency hopping parameters are determined according to the type of the UE.

In the embodiment of the present disclosure, the frequency hopping parameters include one or more of frequency hopping start position, frequency hopping offset, and a number of hops. In an embodiment of the present disclosure, the frequency hopping parameters are determined according to the type of the UE. Specifically, separate frequency hopping parameters can be set for the redcap UE and for the non-redcap UE. In the embodiments of the present disclosure, the redcap UE can set hopping parameters according to its own system bandwidth to avoid hopping out of the redcap system bandwidth during frequency hopping. In another embodiment of the present disclosure, same frequency hopping parameters can also be set for both the redcap UE and the non-redcap UE. The frequency hopping parameters need to take into account the redcap UE to avoid a situation that the redcap UE hops out of a system bandwidth range of the redcap UE. Or, it is possible to maintain current frequency hopping parameters of the non-redcap UE and adjust frequency hopping parameters of the redcap UE.

In the embodiments of the present disclosure, one or more of the frequency hopping start position, the frequency hopping offset, and the number of hops can be adjusted to avoid the situation of hopping out of the system bandwidth range of the redcap UE.

At step 103, frequency hopping is performed according to the determined frequency hopping parameters.

In the embodiments of the present disclosure, frequency hopping can be performed according to the frequency hopping parameters determined by the UE. For example, frequency hopping is performed according to the frequency hopping start position, the frequency hopping offset, and the number of hops.

In the embodiment of the present disclosure, the frequency hopping parameters can be adjusted according to the type of the UE, thereby avoiding a situation of hopping out of a system bandwidth range of a redcap UE.

Figure 3:
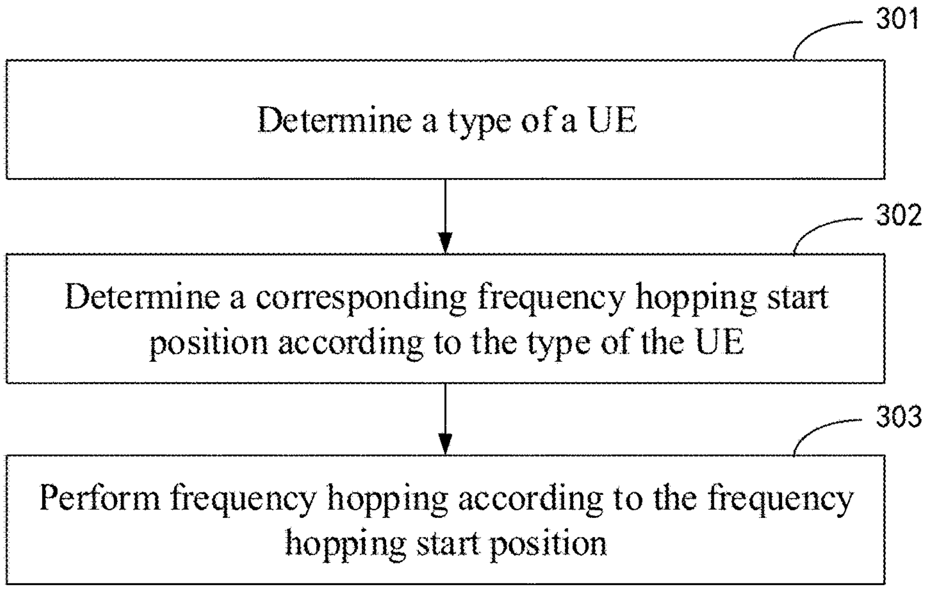
FIG. 3 is a schematic flowchart of another frequency hopping method according to an embodiment of the present disclosure.

FIG. 3 is a schematic flowchart of a frequency hopping method according to an embodiment of the present disclosure, which is executed by a UE. After determining parameters such as a frequency hopping offset value, a number of hops, and a FH time domain granularity, UE can perform frequency hopping according to the determined frequency hopping parameters. It should be noted that in the embodiment of the present disclosure, frequency hopping parameters include the frequency hopping offset value, the number of hops, the FH time domain granularity, and so on. The frequency hopping offset value is used to determine a start position of each hop; the number of hops is used to achieve higher frequency diversity gain by configuring multiple frequency domain positions; and the FH time domain granularity is used to expand basic granularities of time-domain frequency hopping, which can support cross-slot joint channel estimation, or reduce DMRS density for a low mobility or stationary UE.

As shown in FIG. 3, in this embodiment, a frequency hopping parameter can be a frequency hopping start position. The frequency hopping control method includes the following steps:

At step 301, a type of a UE is determined.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR.

At step 302, a corresponding frequency hopping start position is determined according to the type of the UE.

In an embodiment of the present disclosure, the frequency hopping start position can be determined in a same way for a non-redcap UE and a redcap UE. However, for the redcap UE, after determining the frequency hopping start position for the redcap UE, it may be necessary to adjust the frequency hopping start position for the redcap UE, thereby avoiding a situation of hopping out of a system bandwidth range of a redcap UE.

In an embodiment of the present disclosure, the frequency hopping parameter can be determined by the following manner, where the frequency hopping parameter is the frequency hopping start position.

In an embodiment of the present disclosure, determining the UE being a redcap UE, an initial value of a frequency hopping start position of the redcap UE is determined at first, and then the frequency hopping start position is determined according to the initial value of the frequency hopping start position.

In an embodiment of the present disclosure, a corresponding adjustment value can be determined according to a system bandwidth of the redcap UE, and then the initial position of the frequency hopping can be adjusted according to the adjustment value, so as to determine the frequency hopping start position.

In an embodiment of the present disclosure, the adjustment value is determined by:

a protocol; or, a signaling configuration sent by a base station.

In an embodiment of the present disclosure, the adjustment value can be fixed by a protocol or dynamically configured by the base station.

In an embodiment of the present disclosure, for example, if the determined initial value of the frequency hopping start position is n, and n causes a problem of hopping out of a system bandwidth of the redcap UE, it is necessary to adjust n. In another embodiment of the present disclosure, for example, if an initial value of a frequency hopping start position of a nth hop is determined to be "a", and "a" exceeds a maximum system bandwidth supported by the redcap UE, the frequency hopping start position of the nth hop may be changed to a position b of a (n−m)th hop, where b is within the system bandwidth range of the redcap UE, and n>m. In this embodiment, m can be fixed by a protocol or dynamically configured by the base station. m is determined based on the number of hops.

Figure 4:
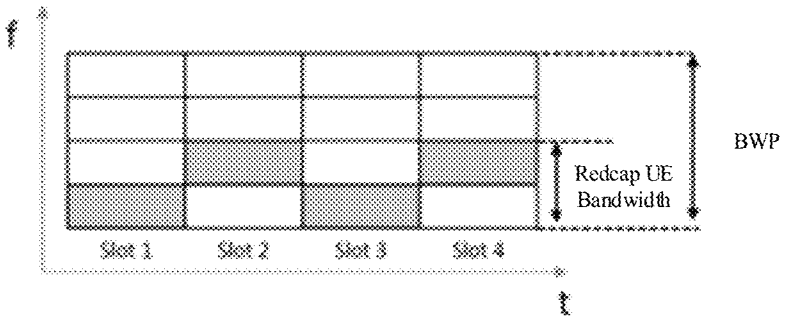
FIG. 4 is a schematic diagram of adjusting a frequency hopping start position according to an embodiment of the present disclosure.

As shown in FIG. 4, it is a schematic diagram of adjusting a frequency hopping start position according to an embodiment of the present disclosure. As shown in FIG. 4, during Slot3, since a situation that exceeds a UE system bandwidth occurs, it is adjusted, for example, subtracting the adjustment value (for example 2), to fall back into system bandwidth of the redcap UE. Similarly, for Slot4, the adjustment value (for example, 2) can also be subtracted.

In an embodiment of the present disclosure, determining the initial value of the frequency hopping start position not exceeding the system bandwidth of the UE, the initial value of the frequency hopping start position can be determined as the frequency hopping start position directly.

In an embodiment of the present disclosure, when the type of the UE is a non-redcap UE, the frequency hopping parameter can be determined as the frequency hopping start position by the following manner.

In an embodiment of the present disclosure, determining the UE is a non-redcap UE, the initial value of the frequency hopping start position is taken as the frequency hopping start position.

In the embodiment of the present disclosure, the base station can inform the UE of the adjustment value by sending signaling to the UE. In an embodiment of the present disclosure, the signaling may include remaining minimum system information (RMSI) signaling.

At step 303, frequency hopping is performed according to the frequency hopping start position.

In an embodiment of the present disclosure, after determining the frequency hopping start position, frequency hopping can be performed according to the frequency hopping start position.

In the embodiment of the present disclosure, for the redcap UE, its initial value of the frequency hopping start position is adjusted to determine the frequency hopping start position corresponding to the redcap UE, thereby avoiding hopping out of the system bandwidth range of a redcap UE.

Figure 5:
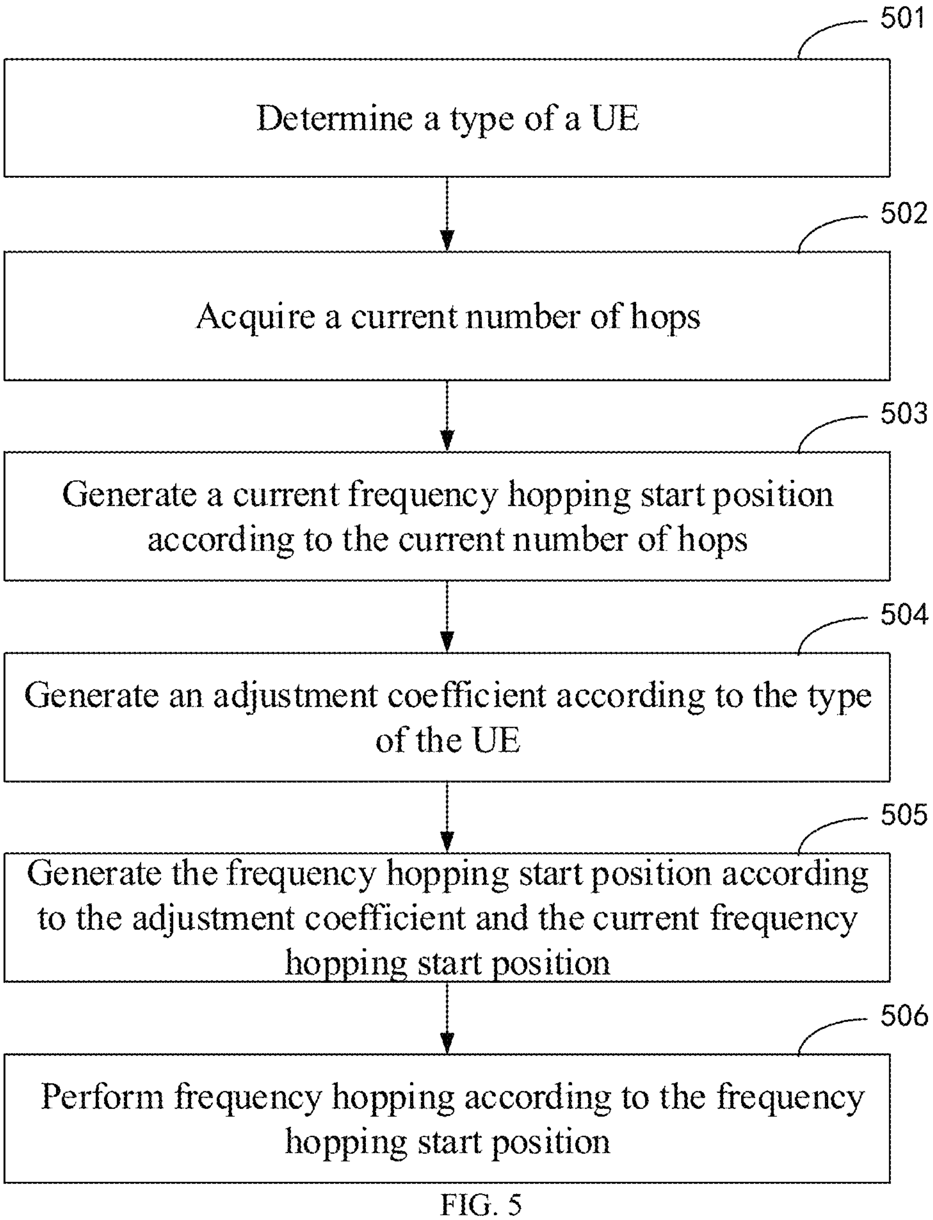
FIG. 5 is a schematic flowchart of another frequency hopping method according to an embodiment of the present disclosure.

FIG. 5 is a schematic flowchart of a frequency hopping method according to an embodiment of the present disclosure; which is executed by a UE. After determining frequency parameters such as a frequency hopping offset value, the number of hops, and a FH time domain granularity, UE can perform frequency hopping according to the determined frequency hopping parameters. It should be noted that in the embodiment of the present disclosure, frequency hopping parameters include the frequency hopping offset value, the number of hops, and the FH time domain granularity and so on. The frequency hopping offset value is used to determine a start position of each hop; the number of hops is used to achieve higher frequency diversity gain by configuring multiple frequency domain positions; and the FH time domain granularity is used to expand basic granularities of time-domain frequency hopping, which can support cross-slot joint channel estimation, or reduce DMRS density for a low mobility or stationary UE.

As shown in FIG. 5, in this embodiment, a corresponding formula for determining a frequency hopping start position can be set for a redcap UE, thereby avoiding a situation of hopping out of a system bandwidth range of the redcap UE. The frequency hopping control method includes the following steps.

At step 501, a type of a UE is determined.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR.

At step 502, a current number of hops is acquired.

In the embodiment of the present disclosure, formulas corresponding to different number of hops are different, so it is necessary to confirm the number of hops.

At step 503, a current frequency hopping start position is generated according to the current number of hops.

In the embodiment of the present disclosure, for UE, $$RB_{start} = (RB_{start} + i * RB_{offset}) \bmod N_{BWP}^{size} i = 0, 1, 2, \ldots\ n$$

can be used as the current frequency hopping start position, where i is the current number of hops, RBstart is the current frequency hopping start position, and RBoffset is an offset.

At step 504, an adjustment coefficient is generated according to the type of the UE.

In the embodiment of the present disclosure, a corresponding adjustment coefficient is generated according to the type of the UE, and the current frequency hopping start position can be adjusted by the adjustment coefficient.

In an embodiment of the present disclosure, for a non-redcap UE, the adjustment coefficient is $$\bmod N_{BWP}^{size}, \text{ where } N_{BWP}^{size}$$

is a bandwidth part (BWP) of the non-redcap UE.

In an embodiment of the present disclosure, for a redcap UE, the adjustment coefficient can be generated according to a system bandwidth of the redcap UE. In another embodiment of the present disclosure, for the redcap UE, the adjustment coefficient is $$\bmod \min(N_{BWP}^{size}, N_{BW}^{size}), \text{ where } N_{BWP}^{size}$$

is a bandwidth part (BWP) of the non-redcap UE, and $$N_{BW}^{size}$$

is a system bandwidth of the redcap UE.

In the embodiment of the present disclosure, the adjustment coefficient generated based on the modulo operation may further be generated based in other manners, which is not limited by the present disclosure.

At step 505, the frequency hopping start position is generated according to the adjustment coefficient and the current frequency hopping start position.

In the embodiment of the present disclosure, the current frequency hopping start position is adjusted by adjusting the adjustment coefficient, so as to generate the frequency hopping start position.

At step 506, frequency hopping is performed according to the frequency hopping start position.

After UE determines its corresponding frequency hopping start position, it performs frequency hopping according to the determined frequency hopping start position.

In this embodiment, the adjustment coefficient can be determined based on the type of the UE, so that the redcap UE can avoid hopping out of the system bandwidth range of the redcap UE.

In an embodiment of the present disclosure, for multiple frequency hopping positions, frequency hopping start positions of the redcap UE and the non-redcap UE can be determined by the following manner.

For the non-redcap UE, the frequency hopping start position can be calculated using the following formula:

$$RB_{start} = (RB_{start} + i * RB_{offset}) \bmod N_{BWP}^{size}\ \ i = 0, 1, 2, \ldots\ n,$$

where i is the number of hops.

For the redcap UE, the frequency hopping start position can be calculated using the following formula:

$$RB_{start}=(RB_{start}+i*RB_{offset})\ \text{mod}\ \min\left(N_{BWP}^{size},N_{BW}^{size}\right)\ i=0,1,2,\ldots,n,$$

where i is the number of hops.

In another embodiment of the present disclosure, for intra-slot frequency hopping and two hops based inter-slot frequency hopping, the frequency hopping start position can further be determined by the following formula.

For the non-redcap UE and intra-slot frequency hopping, the frequency hopping start position can be determined by the following formula:

$$RB_{start}=\begin{cases}RB_{start} & i=0\\ (RB_{start}+RB_{offset})\text{mod}N_{BWP}^{size} & i=1\end{cases},$$

For the non-redcap UE and two hops based inter-slot frequency hopping, the frequency hopping start position can be determined by the following formula:

$$RB_{start}(n_s^u)=\begin{cases}RB_{start} & n_s^u\text{mod}2=0\\ (RB_{start}+RB_{offset})\text{mod}N_{BWP}^{size} & n_s^u\text{mod}2=1\end{cases},$$

For the redcap UE and intra-slot frequency hopping, a frequency hopping start position can be determined by the following formula:

$$RB_{start}=(RB_{start}+i*RB_{offset})\ \text{mod}\ \min\left(N_{BWP}^{size},N_{BW}^{size}\right)\ i=0,1,$$

where i is the number of hops.

For the redcap UE and two hops based inter-slot frequency hopping, the frequency hopping start position can be determined by the following formula:

$$RB_{start}=\begin{cases}RB_{start}\text{mod}\min\left(N_{BWP}^{size},N_{BW}^{size}\right) & n_s^u\text{mod}2=0\\ (RB_{start}+RB_{offset})\text{mod}\min\left(N_{BWP}^{size},N_{BW}^{size}\right) & n_s^u\text{mod}2=1\end{cases},$$

where i is the number of hops.

In other embodiments of the present disclosure, more than two hops can also be performed. For example, for the redcap UE, the frequency hopping start position can be determined by the following formula:

For more than two hops based inter-slot FH of the redcap UE:

$$RB_{start}=\begin{cases}RB_{start} & i=0\\ (RB_{start}+i*RB_{offset})\text{mod}\min\left(N_{BWP}^{size},N_{BW}^{size}\right) & i=1,2,3,\ldots,n\end{cases},$$

where i is the number of hops.

For intra-slot FH of the redcap UE:

$$RB_{start}=\begin{cases}RB_{start} & i=0\\ (RB_{start}+RB_{offset})\text{mod}\min\left(N_{BWP}^{size},N_{BW}^{size}\right) & i=1\end{cases},$$

where i is the number of hops.

For two hops based inter-slot FH of the redcap UE:

$$RB_{start}=\begin{cases}RB_{start} & n_s^u\text{mod}2=0\\ (RB_{start}+RB_{offset})\text{mod}\min\left(N_{BWP}^{size},N_{BW}^{size}\right) & n_s^u\text{mod}2=1\end{cases},$$

is a current slot number.

In the above embodiments, it can be used in scenarios where the redcap UE supports RF (Radio Frequency) retuning between RAR (Random Access Response) and Msg3.

In the embodiment of the present disclosure, the adjustment coefficient is generated according to a minimum value between the system bandwidth of the redcap UE and the BWP of the non-redcap UE. In another embodiment of the present disclosure, both the redcap UE and the non-redcap UE use a same formula for determining the frequency hopping start position. In this embodiment, since the formulas used for the redcap UE and the non-redcap UE are the same (both using the formula for determining the frequency hopping start position of the redcap UE as shown above), the base station does not need to distinguish between the redcap UE and the non-redcap UE. In another embodiment of the present disclosure, the adjustment coefficient is generated according to a minimum value between a BWP of a non-redcap UE and a system bandwidth of a redcap UE, where frequency hopping start positions of the non-redcap UE and the redcap UE are both generated by the adjustment coefficient.

Figure 6:
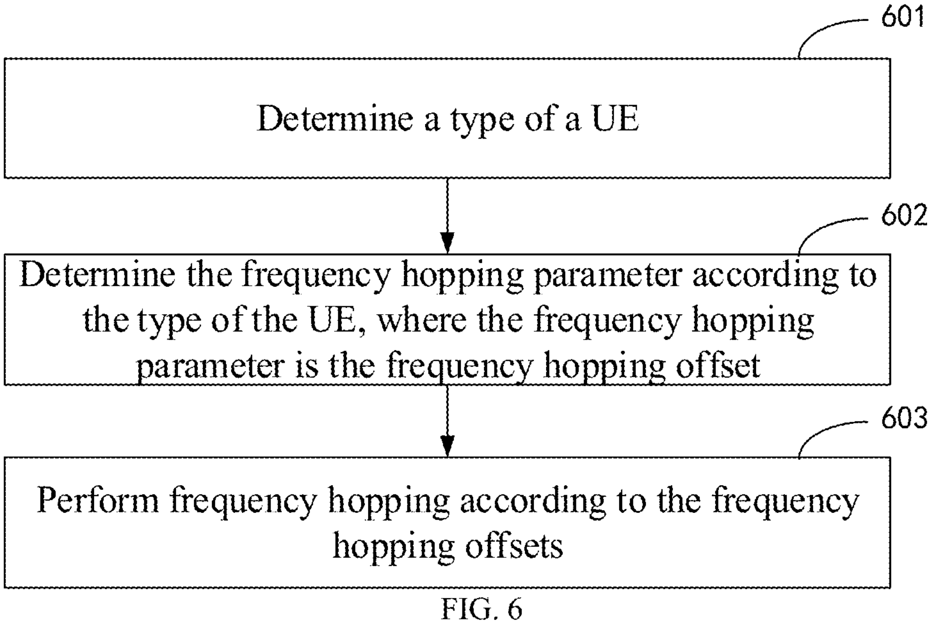
FIG. 6 is a schematic flowchart of another frequency hopping method according to an embodiment of the present disclosure.

FIG. 6 is a schematic flowchart of a frequency hopping method according to an embodiment of the present disclosure; which is executed by a UE. After determining frequency parameters such as a frequency hopping offset value, the number of hops, and a FH time domain granularity, UE can perform frequency hopping according to the determined frequency hopping parameters. It should be noted that in the embodiment of the present disclosure, frequency hopping parameters include the frequency hopping offset value, the number of hops, and the FH time domain granularity. The frequency hopping offset value is used to determine a start position of each hop; the number of hops is used to achieve higher frequency diversity gain by configuring multiple frequency domain positions; and the FH time domain granularity is used to expand basic granularities of time-domain frequency hopping, which can support cross-slot joint channel estimation, or reduce DMRS density for a low mobility or stationary UE.

As shown in FIG. 6, in this embodiment, the frequency hopping parameter may be a frequency hopping offset. In the embodiment of the present disclosure, a problem of hopping out of a system bandwidth of a redcap UE can also be avoided by adjusting the frequency hopping offset of the redcap UE. The frequency hopping control method includes the following steps:

At step 601, a type of a UE is determined.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR.

At step 602, the frequency hopping parameter is determined according to the type of the UE, where the frequency hopping parameter is the frequency hopping offset.

In an embodiment of the present disclosure, an offset configuration table corresponding to the type of the UE can be acquired first; then an offset identification indicated by a base station can be acquired; and the frequency hopping offset can be determined according to the offset identification and the offset configuration table corresponding to the type of the UE.

In an embodiment of the present disclosure, different offset configuration tables are set for different types of UE.

In an embodiment of the present disclosure, the offset configuration table may be specified by a protocol or notified by the base station via a system message.

In an embodiment of the present disclosure, a same offset configuration table can be configured for the non-redcap UE and the redcap UE, and different offset configuration tables can also be configured for the non-redcap UE and the redcap UE. If the same offset configuration table is configured, it is necessary to avoid the redcap UE hopping out of its own system bandwidth.

At step 603, frequency hopping is performed according to the frequency hopping offset.

UE performs frequency hopping according to the frequency hopping offset determined in the above steps.

In the embodiment of the present disclosure, the frequency hopping offset of the redcap UE can be adjusted to avoid a problem of the redcap UE hopping out of a system bandwidth range.

In an embodiment of the present disclosure, when the UE is a non-redcap UE, frequency hopping offsets in a first offset configuration table corresponding to the non-redcap UE are determined according to a BWP of the non-redcap UE; and when the UE is a redcap UE, frequency hopping offsets in a second offset configuration table corresponding to the redcap UE are determined according to a system bandwidth of the redcap UE.

In this embodiment, for intra-slot frequency hopping, the non-redcap UE can use the following first offset configuration table:

TABLE 1

| Number of PRBs for BWP | Offset identification | Offset |
|---|---|---|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |
| | 01 | $\lfloor N_{BWP}^{size}/4 \rfloor$ |
| | 10 | $-\lfloor N_{BWP}^{size}/4 \rfloor$ |
| | 11 | Reserved |

In this embodiment, for intra-slot frequency hopping, the redcap UE can use the following second offset configuration table:

TABLE 2

| Number of PRBs for BWP | Offset identification | Offset |
|---|---|---|
| $N_{BWP}^{size} < 50$ | 0 | $\text{Min}(\lfloor N_{BWP}^{size}/2 \rfloor, \lfloor N_{BWP}^{size}/2 \rfloor)$ |
| | 1 | $\text{Min}(\lfloor N_{BWP}^{size}/4 \rfloor, \lfloor N_{BWP}^{size}/4 \rfloor)$ |
| $N_{BWP}^{size} \geq 50$ | 00 | $\text{Min}(\lfloor N_{BWP}^{size}/2 \rfloor, \lfloor N_{BWP}^{size}/2 \rfloor)$ |
| | 01 | $\text{Min}(\lfloor N_{BWP}^{size}/4 \rfloor, \lfloor N_{BW}^{size}/4 \rfloor)$ |
| | 10 | $-\text{Min}(\lfloor N_{BWP}^{size}/4 \rfloor, \lfloor N_{BW}^{size}/4 \rfloor)$ |
| | 11 | Reserved |

In an embodiment of the present disclosure, the above-mentioned Table 1 and Table 2 may be fixed by a protocol. It can also be configured into the UE by means of a base station indication.

In other embodiments of the present disclosure, for two hops based inter-slot frequency hopping, the non-redcap UE can use the following first offset configuration table:

TABLE 3

| Number of PRBs for BWP | Offset idendification | Offset |
|---|---|---|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |
| | 01 | $\lfloor N_{BWP}^{size}/4 \rfloor$ |
| | 10 | $-\lfloor N_{BWP}^{size}/4 \rfloor$ |
| | 11 | Reserved |

In other embodiments of the present disclosure, for two hops based inter-slot frequency hopping, the redcap UE can use the following second offset configuration table:

TABLE 4

| Number of PRBs for BWP | Offset identification | Offset |
|---|---|---|
| $N_{BWP}^{size} < 50$ | 0 | $\text{Min}(\lfloor N_{BWP}^{size}/2 \rfloor, \lfloor N_{BW}^{size}/2 \rfloor)$ |
| | 1 | $\text{Min}(\lfloor N_{BWP}^{size}/4 \rfloor, \lfloor N_{BW}^{size}/4 \rfloor)$ |
| $N_{BWP}^{size} \geq 50$ | 00 | $\text{Min}(\lfloor N_{BWP}^{size}/2 \rfloor, \lfloor N_{BW}^{size}/2 \rfloor)$ |
| | 01 | $\text{Min}(\lfloor N_{BWP}^{size}/4 \rfloor, \lfloor N_{BW}^{size}/4 \rfloor)$ |

TABLE 4-continued

| Number of PRBs for BWP | Offset identification | Offset |
|---|---|---|
| | 10 | $-\text{Min}(\lfloor N_{BWP}^{size}/4 \rfloor, \lfloor N_{BWP}^{size}/4 \rfloor)$ |
| | 11 | Reserved |

In an embodiment of the present disclosure, in the offset configuration table(s), frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In an embodiment of the present disclosure, the UE may further be configured with the above-mentioned offset configuration table(s) via a system message.

In the embodiment of the present disclosure, both the non-redcap UE and the redcap UE can use a second offset configuration table.

In an embodiment of the present disclosure, the offset configuration table can further be set for more than two hops.

In other embodiments of the present disclosure, for three hops based inter-slot frequency hopping, the non-redcap UE can use the following first offset configuration table:

TABLE 5

| Number of PRBs for BWP | Offset identification | Offset |
|---|---|---|
| $N_{BWP}^{size} < 50$ | 0 | $\lfloor N_{BWP}^{size}/3 \rfloor$ |
| | 1 | $\lfloor N_{BWP}^{size}/6 \rfloor$ |
| $N_{BWP}^{size} \geq 50$ | 00 | $\lfloor N_{BWP}^{size}/3 \rfloor$ |
| | 01 | $\lfloor N_{BWP}^{size}/6 \rfloor$ |
| | 10 | $-\lfloor N_{BWP}^{size}/3 \rfloor$ |
| | 11 | Reserved |

In other embodiments of the present disclosure, for three hops based inter-slot frequency hopping, the redcap UE can use the following second offset configuration table:

TABLE 6

| Number of PRBs for BWP | Offset identification | Offset |
|---|---|---|
| $N_{BWP}^{size} < 50$ | 0 | $\text{Min}(\lfloor N_{BWP}^{size}/3 \rfloor, \lfloor N_{BWP}^{size}/3 \rfloor)$ |
| | 1 | $\text{Min}(\lfloor N_{BWP}^{size}/6 \rfloor, \lfloor N_{BWP}^{size}/6 \rfloor)$ |
| $N_{BWP}^{size} \geq 50$ | 00 | $\text{Min}(\lfloor N_{BWP}^{size}/3 \rfloor, \lfloor N_{BWP}^{size}/3 \rfloor)$ |
| | 01 | $\text{Min}(\lfloor N_{BWP}^{size}/6 \rfloor, \lfloor N_{BWP}^{size}/6 \rfloor)$ |

TABLE 6-continued

| Number of PRBs for BWP | Offset identification | Offset |
|---|---|---|
| | 10 | $-\text{Min}(\lfloor N_{BWP}^{size}/6 \rfloor, \lfloor N_{BWP}^{size}/6 \rfloor)$ |
| | 11 | Reserved |

In the embodiment of the present disclosure, the above-mentioned first offset configuration table 5 and second offset configuration table 6 can be specified by a protocol or notified by a system message.

In the embodiment of the present disclosure, the first offset configuration table and the second offset configuration table are further merged. The merged table is applicable to both the redcap UE and the non-redcap UE, as shown in the following table.

TABLE 7

| Number of PRBs for BWP | Offset identification | Offset |
|---|---|---|
| $N_{BWP}^{size} < 50$ | 00 | $\lfloor N_{BWP}^{size}/2 \rfloor$ |
| | 01 | $\lfloor N_{BWP}^{size}/4 \rfloor$ |
| | 10 | $\lfloor N_{BW}^{size}/2 \rfloor$ |
| | 11 | $\lfloor N_{BW}^{size}/4 \rfloor$ |
| $N_{BWP}^{size} \geq 50$ | 000 | $\lfloor N_{BWP}^{size}/2 \rfloor$ |
| | 001 | $\lfloor N_{BWP}^{size}/4 \rfloor$ |
| | 010 | $-\lfloor N_{BWP}^{size}/4 \rfloor$ |
| | 011 | $\lfloor N_{BW}^{size}/2 \rfloor$ |
| | 100 | $\lfloor N_{BW}^{size}/4 \rfloor$ |
| | 101 | $-\lfloor N_{BW}^{size}/4 \rfloor$ |
| | 110 | reserved |
| | 111 | reserved |

In an embodiment of the present disclosure, a plurality of frequency hopping offset value configuration tables may be aggregated into one large table, after which a first offset identification is retrieved as an index value. Since a plurality of frequency hopping offset value configuration tables are aggregated into one large table, it is necessary to extend bits in corresponding dynamic signaling to indicate its index. An extended bit can reuse a TPC (power control) field in an RAR UL grant.

In an embodiment of the present disclosure, when a repetition is required, a coverage is poor, and a terminal generally uses full power for the transmission. At this time, the TPC (power control) field is invalid, so one or more bits of the TPC field can be reused as extended bit(s) (for the first offset identification).

In an embodiment of the present disclosure, the base station may set a first offset configuration table and a second offset configuration table, or, a first offset configuration table or a second offset configuration table. If a BWP of the non-redcap UE is greater than the system bandwidth of the redcap UE, the base station configures the first offset configuration table and the second offset configuration table. If the BWP of the non-redcap UE is less than or equal to the system bandwidth of the redcap UE, only the first offset configuration table is configured in the base station, and the redcap UE also uses the first offset configuration table.

In an embodiment of the present disclosure, the base station can set a first offset configuration table and a second offset configuration table. The non-redcap UE uses the first offset configuration table to determine the frequency hopping start position, while the redcap UE uses the second offset configuration table to determine the frequency hopping start position.

In an embodiment of the present disclosure, if the offset configuration table is notified by a system message, only the second offset configuration table may be sent in this embodiment, and both the non-redcap UE and the redcap UE use the second offset configuration table to determine the frequency hopping start position. In this way, the base station may not need to distinguish the types of UE.

In an embodiment of the present disclosure, the offset(s) can be set not only by the above-mentioned offset configuration table, but also by a protocol, or may be configured by a system message from the base station.

Figure 7:
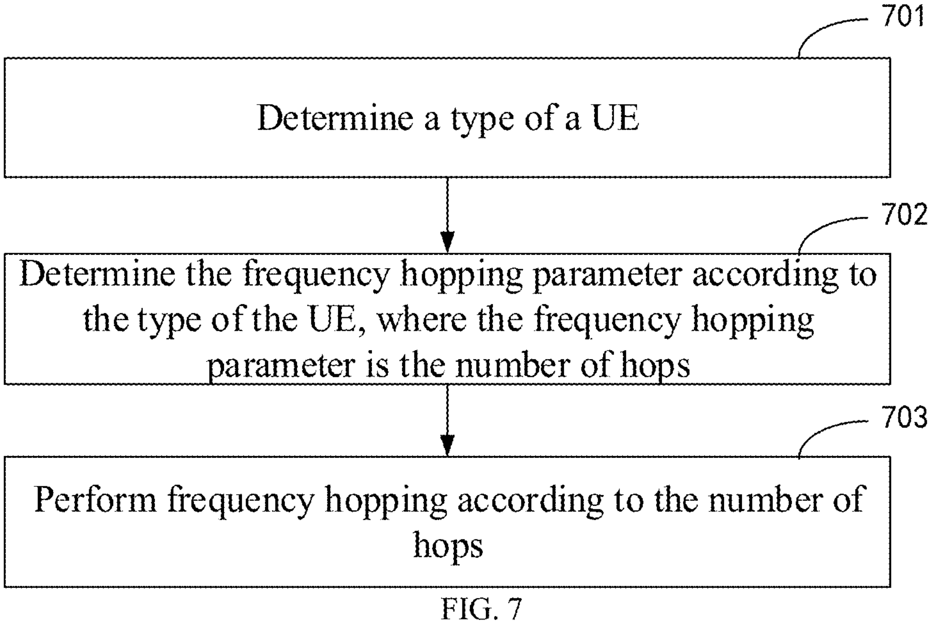
FIG. 7 is a schematic flowchart of a frequency hopping method according to an embodiment of the present disclosure.

FIG. 7 is a schematic flowchart of a frequency hopping method according to an embodiment of the present disclosure, which is executed by a UE, so that after determining parameters such as a frequency hopping offset value, a number of hops, and a FH time domain granularity, the UE can perform frequency hopping according to the determined frequency hopping parameters. It should be noted that in the embodiment of the present disclosure, frequency hopping parameters include the frequency hopping offset value, the number of hops, the FH time domain granularity, and so on. The frequency hopping offset value is used to determine a start position of each hop; the number of hops is used to achieve higher frequency diversity gain by configuring multiple frequency domain positions; and the FH time domain granularity is used to expand basic granularities of time-domain frequency hopping, which can support cross-slot joint channel estimation, or reduce DMRS density for a low mobility or stationary UE.

As shown in FIG. 7, in this embodiment, the frequency hopping parameter includes a number of hops. In the embodiment of the present disclosure, a problem of hopping out of a system bandwidth of a redcap UE can also be avoided by adjusting the number of hops of the redcap UE. The frequency hopping control method includes the following steps.

At step 701, a type of a UE is determined.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR.

At step 702, the frequency hopping parameter is determined according to the type of the UE, where the frequency hopping parameter is the number of hops.

In the embodiment of the present disclosure, if the UE is a non-redcap UE, a first number of hops is taken as the number of hops of the non-redcap UE; and if the UE is a redcap UE, a second number of hops is taken as the number of hops of the redcap UE, where the first number of hops is greater than the second number of hops.

In the embodiment of the present disclosure, the number of hops supported by the non-redcap UE is greater than the number of hops supported by the redcap UE.

In the embodiment of the present disclosure, the above-mentioned first number of hops and second number of hops may be indicated by remaining minimum system information (RMSI), random access response (RAR), or downlink control information (DCI) from the base station.

In the embodiment of the present disclosure, the first number of hops and the second number of hops are configured by a protocol or indicated by a base station. In an embodiment of the present disclosure, the base station may broadcast the first number of hops and the second number of hops through the RMSI.

In an embodiment of the present disclosure, the number of hops corresponding to the non-redcap UE may be indicated by the base station, and the number of hops corresponding to the redcap UE may be specified by a protocol.

In another embodiment of the present disclosure, it is determined whether a BWP of a non-redcap UE is greater than a system bandwidth of a redcap UE. If the BWP of the non-redcap UE is greater than the system bandwidth of the redcap UE, a first preset number is taken as a number of hops of the non-redcap UE, and a second preset number is taken as a number of hops of the redcap UE, where the first preset number of hops is greater than the second preset number of hops. And if the BWP of the non-redcap UE is less than or equal to a system bandwidth of the redcap UE, the first preset number is taken as the number of hops of the non-redcap UE and the redcap UE.

In another embodiment of the present disclosure, a first indication number and a second indication number indicated by the base station are received, where the first indication number is greater than the second indication number. If a BWP of a non-redcap UE is greater than a system bandwidth of a redcap UE, the first indication number is taken as a number of hops of the non-redcap UE, and the second indication number is taken as a number of hops of the redcap UE.

In another embodiment of the present disclosure, a third indication number is received from the base station. If a first BWP of the non-redcap UE is less than or equal to the system bandwidth of the redcap UE, the third indication number is taken as a number of hops of the non-redcap UE and the redcap UE.

It should be noted that the above-mentioned first indication number, second indication number, or third indication number are indicated by RMSI, an RAR, or DCI from the base station.

In an embodiment of the present disclosure, a preset value, for example 0, can also be notified or set for the redcap UE, that is, the redcap UE does not perform frequency hopping.

In this embodiment, intra-slot frequency hopping may be applied as well as inter-slot frequency hopping.

In an embodiment of the present disclosure, the number of hops of the non-redcap UE can be configured by the base station, and the number of hops of the redcap UE can also be set to a fixed value. In an embodiment of the present disclosure, a value configured by the base station may be greater than a preset value specified by a protocol for the redcap UE.

At step 703, frequency hopping is performed according to the number of hops.

UE performs frequency hopping according to the number of hops determined in the above steps.

In the embodiment of the present disclosure, the number of hops of the redcap UE can be adjusted to avoid a problem of the redcap UE hopping out of a system bandwidth range.

Figure 8:
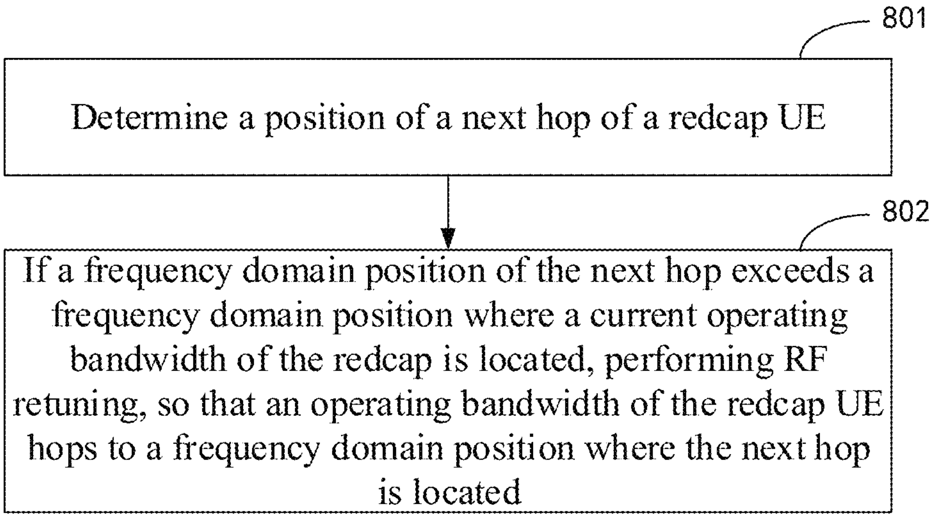
FIG. 8 is a schematic flowchart of another frequency hopping method according to an embodiment of the present disclosure.

FIG. 8 is a schematic flowchart of a frequency hopping method according to an embodiment of the present disclosure, which is performed by a redcap UE. It should be noted that in the embodiment of the present disclosure, frequency hopping parameters include the frequency hopping offset value, the number of hops, the FH time domain granularity, and so on. The frequency hopping offset value is used to determine a start position of each hop; the number of hops is used to achieve higher frequency diversity gain by configuring multiple frequency domain positions; and the FH time domain granularity is used to expand basic granularities of time-domain frequency hopping, which can support cross-slot joint channel estimation, or reduce DMRS density for a low mobility or stationary UE.

As shown in FIG. 8, in this embodiment, an adjustment can be made by means of RF retuning. The frequency hopping control method includes the following steps.

At step 801, a position of a next hop of a redcap UE is confirmed.

Figure 9A:
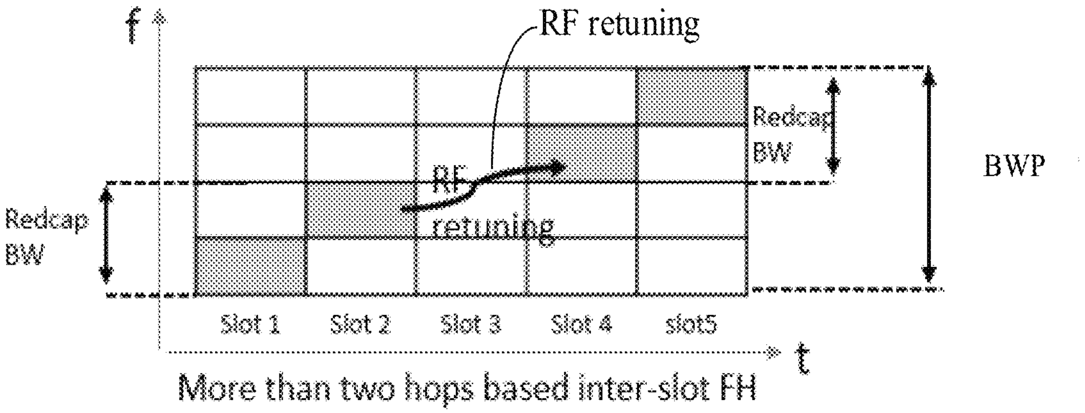
FIGS. 9A and 9B are schematic diagrams of performing radio frequency retuning according to an embodiment of the present disclosure.

As shown in FIG. 9A, it is a schematic diagram of performing radio frequency retuning according to an embodiment of the present disclosure. As shown in FIG. 9A, a next hop time domain position of the redcap UE is Slot3.

At step 802, if a frequency domain position of the next hop exceeds a frequency domain position where a current operating bandwidth of the redcap is located, performing RF retuning, so that an operating bandwidth of the redcap UE hops to a frequency domain position where the next hop is located.

Further referring to FIG. 9A, the next hop frequency domain position of the redcap UE exceeds a frequency domain range where a current operating bandwidth of the redcap UE is located. Therefore, it may be necessary to perform RF retuning on the redcap UE, so that the operating bandwidth of the redcap UE hops to the frequency domain position where the next hop is located, for example, a frequency domain position corresponding to Slot4 in FIG. 9A.

In the embodiment of the present disclosure, a time interval for radio frequency retuning is specified by a protocol as a fixed value, or indicated by a base station.

In the embodiment of the present disclosure, the time interval is indicated by a system message, a media access control control element (MAC CE), or downlink control information (DCI) signaling.

Figure 9B:
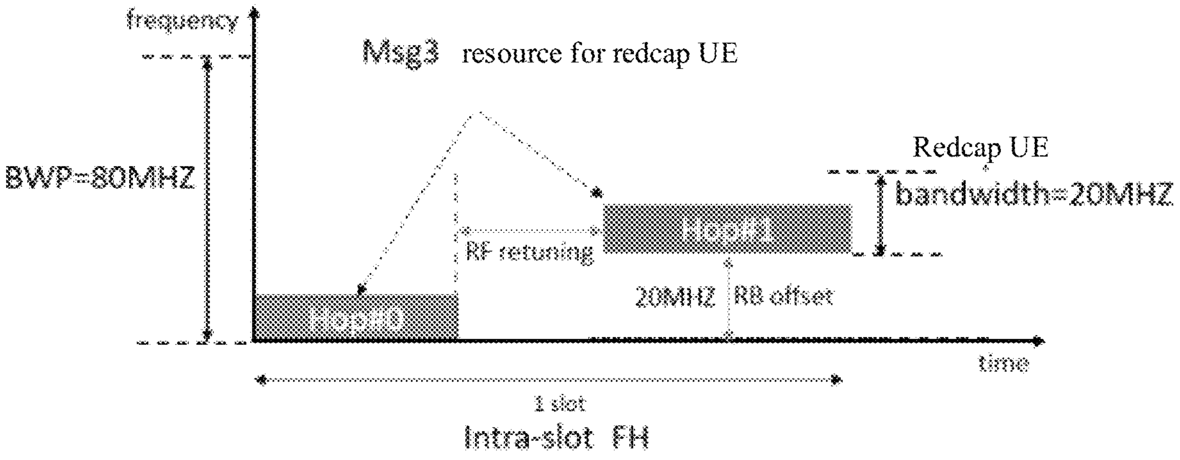

As shown in FIG. 9B, it is another schematic diagram of performing radio frequency retuning according to an embodiment of the present disclosure. The redcap UE hops from Hop#0 to Hop#1 by means of RF retuning.

In the embodiment of the present disclosure, for intra-slot frequency hopping, if the RF retuning solution of the embodiment of the present disclosure is adopted, the RF retuning time+number of symbols for PUSCH<=preset number of symbols, e.g., 14, can be made for physical uplink shared channel (PUSCH) time domain resource allocation.

In the above embodiments, when the redcap UE and the non-redcap UE share a BWP, embodiments of the present disclosure can support Msg3 transmission of the redcap UE and the non-redcap UE supporting frequency hopping mechanisms, including traditional intra-slot frequency hopping, inter-slot frequency hopping, and more than two hops based inter-slot frequency hopping, as well as inter-slot frequency hopping solutions of time domain granularity enhancement.

Figure 10:
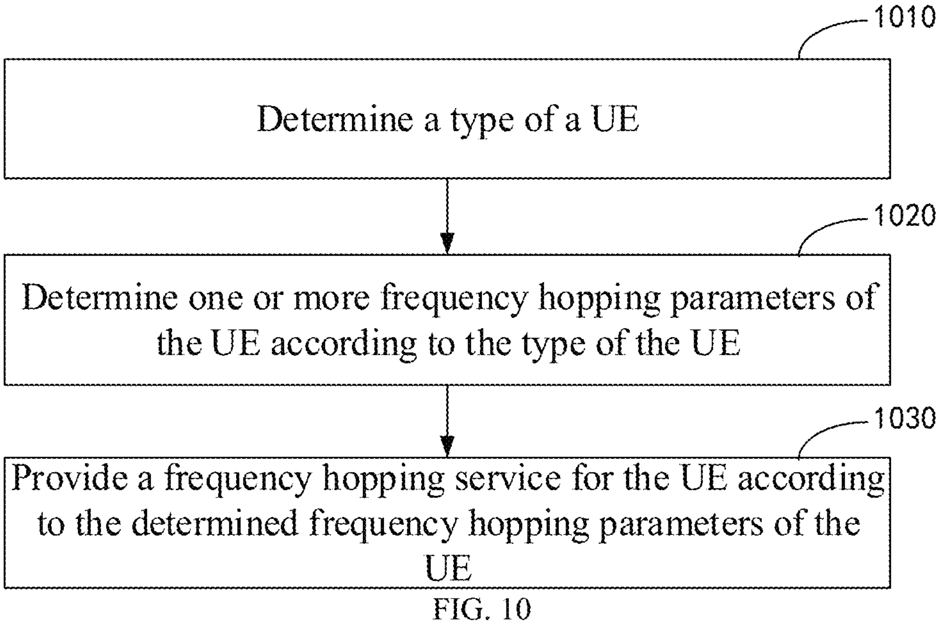
FIG. 10 is a schematic flowchart of a frequency hopping method according to an embodiment of the present disclosure.

FIG. 10 is a schematic flowchart of a frequency hopping method according to an embodiment of the present disclosure, which is executed by a base station, so that after determining parameters such as a frequency hopping offset value, a number of hops, and a FH time domain granularity, a UE can perform frequency hopping according to the determined frequency hopping parameters. It should be noted that in the embodiments of the present disclosure, frequency hopping parameters include the frequency hopping offset value, the number of hops, the FH time domain granularity and so on. The frequency hopping offset value is used to determine a start position of each hop; the number of hops is used to achieve a higher frequency diversity gain by configuring multiple frequency domain positions; and the FH time domain granularity is used to expand basic granularities of time-domain frequency hopping, which can support cross-slot joint channel estimation, or reduce DMRS (Demodulation Reference Signal) density for a low mobility or stationary UE.

As shown in FIG. 10, the frequency hopping control method includes the following steps.

At step 1010, a type of a UE is determined.

In the embodiments of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR. In the LTE 4G system, two major technologies, MTC and NB-IoT, have been proposed to support IoT services. These two major technologies are mainly aimed at scenarios such as low rate and high latency, for example, meter reading and environmental monitoring. At present, NB-IoT can only support rates of up to a few hundred kilobytes (k), while MTC can only support rates of up to a few megabytes (M). But at the same time, on the other hand, with the continuous development of the IoT business, for example, popularization of video surveillance, smart home, wearable devices, industrial sensor monitoring and other business. These business typically require rates ranging from tens to 100M, and also have relatively strict latency requirements. Therefore, MTC and NB-IoT technologies in LTE are difficult to meet these requirements. In this embodiment, this new type of UE is collectively referred to as a Reduced Capability UE, i.e., a redcap UE, while a current normal terminal is referred to as a non-redcap UE in the embodiment of the present disclosure.

In an embodiment of the present disclosure, a redcap UE typically has the following features:

Low cost, low complexity

A certain degree of coverage enhancement

Power savings.

Due to the current NR (new radio) being designed for high-end terminals such as high-speed and low latency, the current design cannot meet the above requirements for the redcap UE. Therefore, it is necessary to modify the current NR system to meet the requirements of the redcap UE. For example, in order to meet the requirements of low cost and low complexity, a bandwidth of the redcap UE can be limited, for example, to 10M Hz or 20M Hz, or the number of receiving antennas for the redcap UE can be limited. For power savings, a possible optimization direction is to reduce the processing complexity of user equipment, such as only receiving a PDCCH (Physical Downlink Control Channel) in a slot, and entering a micro-sleep state at other symbols in the same slot. For a certain degree of coverage enhancement, multiple repeated transmissions (repetitions) can be performed on each channel, increase aggregation level and reduce bit rate, etc.

In an embodiment of the present disclosure, the type of the UE can be determined based on a size of a bandwidth. In an embodiment of the present disclosure, a base station can obtain a bandwidth of the UE, and the type of the UE can be determined according to a bandwidth size of the UE, that is, a redcap UE or a non-redcap UE. In other embodiments of the present disclosure, two types of UE can further be distinguished based on a physical random access channel (PRACH).

As shown in FIG. 2, in an embodiment of the present disclosure, the frequency hopping offset value is used to determine a start position of each hop. The number of hops can be understood as hop numbers in the frequency hopping: for example, if Message3 (msg3)is repeatedly transmitted 8 times, the FH time domain granularity is 1 slot, and the number of hops can be 4, a frequency hopping mode can be shown in FIG. 2. That is to say, during a repetition process, the transmission of msg3 has 4 different frequency domain positions (as shown in the grey part of FIG. 2).

At step 1020, one or more frequency hopping parameters of the UE are determined according to the type of the UE.

In the embodiment of the present disclosure, the frequency hopping parameters include one or more of frequency hopping start position, frequency hopping offset, and a number of hops. In an embodiment of the present disclosure, the frequency hopping parameters are determined according to the type of the UE. Specifically, separate frequency hopping parameters can be set for the redcap UE and separate frequency hopping parameters can also be set for the non-redcap UE, so that the frequency hopping parameters of redcap UE and non-redcap UE are different, thereby avoiding a situation that the redcap UE may hop out of a system bandwidth of the redcap UE during frequency hopping. In another embodiment of the present disclosure, same frequency hopping parameters can also be set for both the redcap UE and the non-redcap UE. The frequency hopping parameters need to take into account the redcap UE to avoid a situation hopping out of a system bandwidth range of the redcap UE. Or, it is possible to maintain current frequency hopping parameters of the non-redcap UE and adjust frequency hopping parameters of the redcap UE.

At step 1030, a frequency hopping service is provided for the UE according to the determined frequency hopping parameters of the UE.

In the embodiments of the present disclosure, the frequency hopping service can be provided to the UE according to the determined frequency hopping parameters of the UE.

Figure 11:
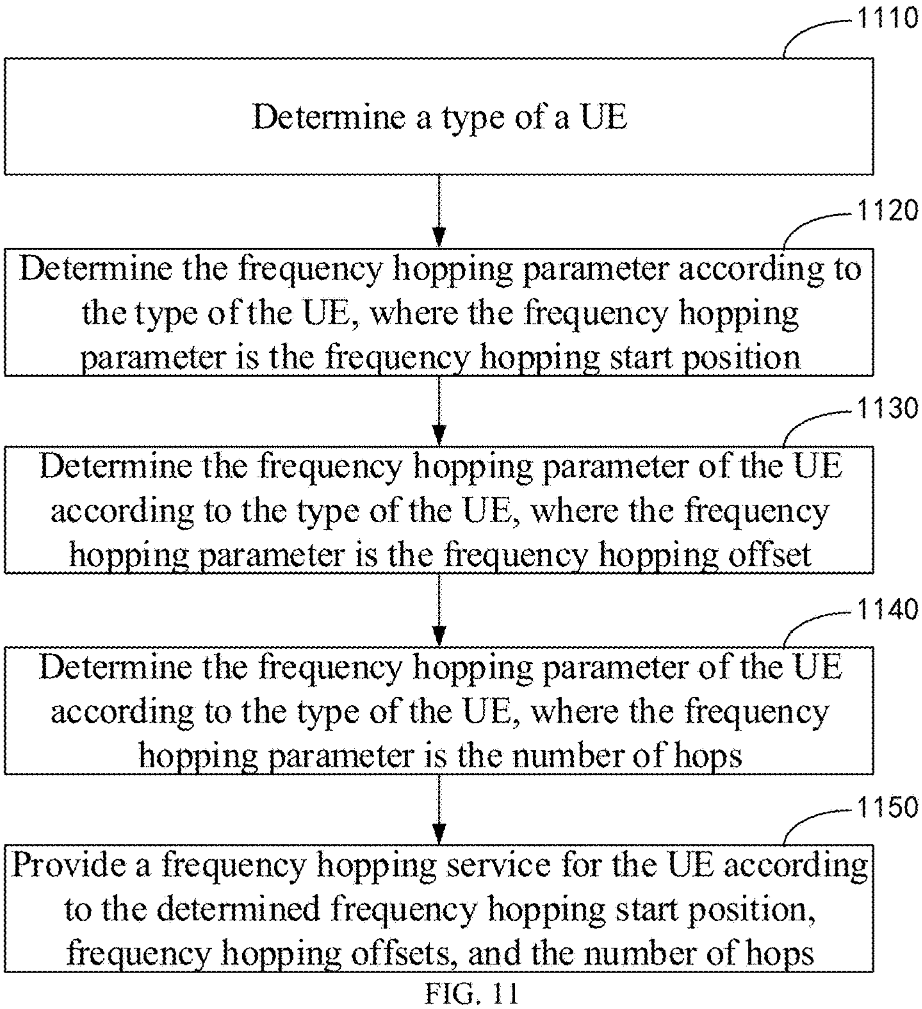
FIG. 11 is a schematic flowchart of another frequency hopping method according to an embodiment of the present disclosure.

FIG. 11 is a schematic flowchart of a frequency hopping method according to an embodiment of the present disclosure; which is executed by a base station. It should be noted that in the embodiment of the present disclosure, frequency hopping parameters include the frequency hopping offset value, the number of hops, the FH time domain granularity and so on. The frequency hopping offset value is used to determine a start position of each hop; the number of hops is used to achieve higher frequency diversity gain by configuring multiple frequency domain positions; and the FH time domain granularity is used to expand basic granularities of time-domain frequency hopping, which can support cross-slot joint channel estimation, or reduce DMRS density for a low mobility or stationary UE.

As shown in FIG. 11, in this embodiment, a frequency hopping parameter can be a frequency hopping start position. The frequency hopping control method includes the following steps.

At step 1110, a type of a UE is determined.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR.

In the embodiment of the present disclosure, the types of UE include a redcap UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR. In the LTE 4G system, two major technologies, MTC and NB-IoT, have been proposed to support IoT services. These two major technologies are mainly aimed at scenarios such as low rate and high latency, for example, meter reading and environmental monitoring. At present, NB-IoT can only support rates of up to a few hundred kilobytes (k), while MTC can only support rates of up to a few megabytes (M). But at the same time, on the other hand, with the continuous development of the IoT business, for example, popularization of video surveillance, smart home, wearable devices, industrial sensor monitoring and other business. These business typically require rates ranging from tens to 100M, and also have relatively strict latency requirements. Therefore, MTC and NB-IoT technologies in LTE are difficult to meet these requirements. In this embodiment, this new type of UE is collectively referred to as a Reduced Capability UE, i.e., a redcap UE, while a current normal terminal is referred to as a non-redcap UE in the embodiment of the present disclosure.

In an embodiment of the present disclosure, a redcap UE typically has the following features:

Low cost, low complexity

A certain degree of coverage enhancement

Power savings.

Due to the current NR new radio being designed for high-end terminals such as high-speed and low latency, the current design cannot meet the above requirements for the redcap UE. Therefore, it is necessary to modify the current NR system to meet the requirements of the redcap UE. For example, in order to meet the requirements of low cost and low complexity, a bandwidth of the redcap UE can be limited, for example, to 10M Hz or 20M Hz, or the number of receiving antennas for the redcap UE can be limited. For power savings, a possible optimization direction is to reduce the processing complexity of user equipment, such as only receiving a PDCCH (Physical Downlink Control Channel) in a slot, and entering a micro-sleep state at other symbols in the same slot. For a certain degree of coverage enhancement, multiple repeated transmissions (repetitions) can be performed on each channel to increase aggregation level, reduce bit rate, etc.

In an embodiment of the present disclosure, the type of the UE can be determined based on a size of a bandwidth. In an embodiment of the present disclosure, a base station can obtain a bandwidth of the UE, and the type of the UE can be determined according to a bandwidth size of the UE, that is, a redcap UE or a non-redcap UE. In other embodiments of the present disclosure, two types of UE can further be distinguished based on a physical random access channel (PRACH).

As shown in FIG. 2, in an embodiment of the present disclosure, the frequency hopping offset value is used to determine a start position of each hop. The number of hops can be understood as hop numbers in the frequency hopping: for example, if Message3 (msg3)is repeatedly transmitted 8 times, the FH time domain granularity is 1 slot, and the number of hops can be 4, then a frequency hopping mode can be shown in FIG. 2. That is to say, during a repetition process, the transmission of msg3 has 4 different frequency domain positions (as shown in the grey part of FIG. 2).

At step 1120, the frequency hopping parameter is determined according to the type of the UE, where the frequency hopping parameter is the frequency hopping start position.

In an embodiment of the present disclosure, the frequency hopping start position can be determined in a same way for a non-redcap UE and a redcap UE. However, for the redcap UE, after determining the frequency hopping start position for the redcap UE, it is necessary to adjust the frequency hopping start position for the redcap UE, so that it is reduced, thereby avoiding a situation of hopping out of a system bandwidth range of a redcap UE.

In an embodiment of the present disclosure, the frequency hopping parameter can be determined as the frequency hopping start position by the following manner.

Determine the UE being a redcap UE, an initial value of a frequency hopping start position of the redcap UE is determined, and then the frequency hopping start position of the UE is determined according to an initial value of the frequency hopping start position.

The adjustment value is determined by: a protocol; or, sending signaling to the UE for configuration.

In an embodiment of the present disclosure, the adjustment value can be fixed by a protocol or dynamically configured by the base station.

In the embodiment of the present disclosure, a system bandwidth of the UE is determined, and an adjustment value is acquired when the initial value of the frequency hopping start position is determined exceeding the system bandwidth of the UE. Then, the initial value of the frequency hopping start position is adjusted according to the adjustment value to generate the frequency hopping start position of the UE.

In the embodiment of the present disclosure, determine the initial value of the frequency hopping start position not exceeding the system bandwidth of UE, the initial value of the frequency hopping start position is determined as the start frequency hopping position of UE.

In an embodiment of the present disclosure, for example, if the determined initial value of the frequency hopping start position is n and n causes a problem of hopping out of a system bandwidth of the redcap UE, it is necessary to adjust n. In another embodiment of the present disclosure, for example, if an initial value of a frequency hopping start position of a nth hop is determined to be "a", and "a" exceeds a maximum system bandwidth supported by the redcap UE, the frequency hopping start position of the nth hop may be changed to a position b of a (n−m)th hop, where b is within the system bandwidth range of the redcap UE, and n>m. In this embodiment, m can be fixed by a protocol or dynamically configured by the base station. m is determined based on the number of hops.

As shown in FIG. 4, it is a schematic diagram of adjusting a frequency hopping start position according to an embodiment of the present disclosure. As shown in FIG. 4, during Slot3 (slot 3), since a situation that exceeds a UE system bandwidth occurs, it is adjusted, for example, subtracting the adjustment value (for example 2), to fall back into system bandwidth of the redcap UE. Similarly, for Slot4, the adjustment value (for example, 2) can also be subtracted.

In an embodiment of the present disclosure, determining the UE being a non-redcap UE, the initial value of the frequency hopping start position is taken as the frequency hopping start position.

In the embodiment of the present disclosure, the base station can inform the UE of the adjustment value by sending signal to the UE. In an embodiment of the present disclosure, the signaling may include remaining minimum system information (RMSI) signaling.

In the embodiment of the present disclosure, a current number of hops of the UE is acquired; a current frequency hopping start position of the UE is generated according to the current number of hops; an adjustment coefficient is generated according to the type of the UE; and the frequency hopping start position of the UE is generated according to the adjustment coefficient and the current frequency hopping start position.

In the embodiment of the present disclosure, for UE, $$RB_{start} = (RB_{start} + i * RB_{offset}) \bmod N_{BWP}^{size} i = 0, 1, 2, \ldots\ n$$

can be used as the current frequency hopping start position, where i is the current number of hops, RBstart is the current frequency hopping start position, and RBoffset is an offset.

In the embodiment of the present disclosure, if the UE is a non-redcap UE, a bandwidth part (BWP) of the non-redcap UE is acquired and the adjustment coefficient is generated according to the BWP; and if the UE is a redcap UE, a system bandwidth of the redcap UE is acquired and the adjustment coefficient is generated at least according to the system bandwidth.

In an embodiment of the present disclosure, for the non-redcap UE, the adjustment coefficient is $$\bmod N_{BWP}^{size}, \text{ where } N_{BWP}^{size}$$

is a bandwidth part (BWP) of the non-redcap UE.

In an embodiment of the present disclosure, for the redcap UE, the adjustment coefficient can be generated according to a system bandwidth of the redcap UE. In another embodiment of the present disclosure, for the redcap UE, the adjustment coefficient is $$\bmod \min\left(N_{BWP}^{size}, N_{BW}^{size}\right), \text{ where } N_{BWP}^{size}$$

is a bandwidth part (BWP) of the non-redcap UE, and $$N_{BW}^{size}$$

is a system bandwidth of the redcap UE.

In the embodiment of the present disclosure, the adjustment coefficient generated based on the modulo operation may further be generated based in other manners, which is not limited by the present disclosure.

In the embodiment of the present disclosure, an implementation of generating the adjustment coefficient according to the system bandwidth can be: generating the adjustment coefficient according to a minimum value between the system bandwidth of the redcap UE and the BWP of the non-redcap UE.

In an embodiment of the present disclosure, the adjustment coefficient is generated according to a minimum value between a BWP of a non-redcap UE and a system bandwidth of a redcap UE, where frequency hopping start positions of the non-redcap UE and the redcap UE are both generated by the adjustment coefficient.

At step 1130, the frequency hopping parameter of the UE is determined according to the type of the UE, where the frequency hopping parameter is the frequency hopping offset.

In the embodiment of the present disclosure, an offset configuration table corresponding to the type of the UE is sent to the UE, and an offset identification is sent to the UE.

The offset configuration table is determined by: a protocol; or, sending a signaling to the UE for configuration.

In an embodiment of the present disclosure, different offset configuration tables are set for different types of UE.

In an embodiment of the present disclosure, a same offset configuration table can be configured for the non-redcap UE and the redcap UE, and different offset configuration tables can also be configured for the non-redcap UE and the redcap UE. By configuring a same offset configuration table, the redcap UE can be avoided from hopping out of its own system bandwidth.

In the embodiment of the present disclosure, if the UE is a non-redcap UE, frequency hopping offsets in a first offset configuration table corresponding to the non-redcap UE are determined according to a BWP of the non-redcap UE; and if the UE is a redcap UE, frequency hopping offsets in a second offset configuration table corresponding to the redcap UE are determined according to a system bandwidth of the redcap UE.

The frequency hopping offsets in the second offset configuration table are determined according to a minimum value between the system bandwidth of the redcap UE and the BWP of the non-redcap UE.

In an embodiment of the present disclosure, both the non-redcap UE and the redcap UE can use the second offset configuration table.

In the embodiment of the present disclosure, frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

At step 1140, the frequency hopping parameter of the UE is determined according to the type of the UE, where the frequency hopping parameter is the number of hops.

In the embodiment of the present disclosure, if the UE is a non-redcap UE, a first number of hops is taken as the number of hops of the non-redcap UE; and if the UE is a redcap UE, a second number of hops is taken as the number of hops of the redcap UE, where the first number of hops is greater than the second number of hops.

The number of hops supported by the non-redcap UE is greater than the number of hops supported by the redcap UE.

The first number of hops and the second number of hops are configured by a protocol or indicated by a base station.

The first number of hops and second number of hops may be indicated by remaining minimum system information (RMSI), random access response (RAR), or downlink control information (DCI) from the base station.

In an embodiment of the present disclosure, it is determined whether a BWP of a non-redcap UE is greater than a system bandwidth of a redcap UE; if the BWP of the non-redcap UE is greater than the system bandwidth of the redcap UE, a first preset number is taken as a number of hops of the non-redcap UE, and a second preset number is taken as a number of hops of the redcap UE, where the first preset number of hops is greater than the second preset number of hops; and if the BWP of the non-redcap UE is less than or equal to a system bandwidth of the redcap UE, the first preset number is taken as the number of hops of the non-redcap UE and the redcap UE.

In an embodiment of the present disclosure, the base station sends a first indication number and a second indication number, where the first indication number is greater than the second indication number; if a BWP of a non-redcap UE is greater than a system bandwidth of a redcap UE, the first indication number is taken as a number of hops of the non-redcap UE, and the second indication number is taken as a number of hops of the redcap UE.

In an embodiment of the present disclosure, a third indication number is sent, where if a first BWP of the non-redcap UE is less than or equal to the system bandwidth of the redcap UE, the third indication number is taken as a number of hops of the non-redcap UE and the redcap UE.

It should be noted that the above-mentioned first indication number and second indication number, or third indication number are indicated by an RMSI, an RAR, or a DCI from the base station.

In an embodiment of the present disclosure, a preset value, for example 0, can also be notified or set for the redcap UE, that is, the redcap UE does not perform frequency hopping.

In the embodiment of the present disclosure, the number of hops corresponding to the non-redcap UE is indicated by the base station, and the number of hops corresponding to the redcap UE is specified by a protocol.

At step 1150, a frequency hopping service is provided for the UE according to the determined frequency hopping start position, frequency hopping offset, and the number of hops.

In the embodiment of the present disclosure, after determining the frequency hopping start position, the frequency hopping service can be performed according to the determined frequency hopping start position.

In this embodiment, the adjustment coefficient can be determined based on the type of the UE, so that the redcap UE can avoid hopping out of the system bandwidth range of the redcap UE.

In an embodiment of the present disclosure, for multiple frequency hopping positions, frequency hopping start positions of the redcap UE and the non-redcap UE can be determined by the following manner.

For the non-redcap UE, the frequency hopping start position can be calculated using the following formula:

$$RB_{start} = (RB_{start} + i * RB_{offset}) \bmod N_{BWP}^{size} \quad i = 0, 1, 2, \ldots n,$$

where i is the number of hops.

For the redcap UE, the frequency hopping start position can be calculated using the following formula:

$$RB_{start}=(RB_{start}+i*RB_{offset})\bmod\min(N_{BWP}^{size},N_{BW}^{size})\ i=0,1,2,\ldots,n,$$

where i is the number of hops.

In another embodiment of the present disclosure, for intra-slot frequency hopping and two hops based inter-slot frequency hopping, the frequency hopping start position can further be determined by the following formula.

For the non-redcap UE and intra-slot frequency hopping, the frequency hopping start position can be determined by the following formula:

$$RB_{start}=\begin{cases}RB_{start} & i=0\\ (RB_{start}+RB_{offset})\bmod N_{BWP}^{size} & i=1\end{cases},$$

For the non-redcap UE and two hops based inter-slot frequency hopping, the frequency hopping start position can be determined by the following formula:

$$RB_{start}(n_s^u)=\begin{cases}RB_{start} & n_s^u\bmod 2=0\\ (RB_{start}+RB_{offset})\bmod N_{BWP}^{size} & n_s^u\bmod 2=1\end{cases},$$

For the redcap UE and intra-slot frequency hopping, a frequency hopping start position can be determined by the following formula:

$$RB_{start}(RB_{start}=(RB_{start}+i*RB_{offset})\bmod\min(N_{BWP}^{size},N_{BW}^{size})\ i=0,1,$$

where i is the number of hops.

For the redcap UE and two hops based inter-slot frequency hopping, the frequency hopping start position can be determined by the following formula:

$$RB_{start}=\begin{cases}RB_{start}\bmod\min(N_{BWP}^{size},N_{BW}^{size}) & n_s^u\bmod 2=0\\ (RB_{start}+RB_{offset})\bmod\min(N_{BWP}^{size},N_{BW}^{size}) & n_s^u\bmod 2=1\end{cases},$$

where i is the number of hops.

In other embodiments of the present disclosure, more than two hops can also be performed. For example, for the redcap UE, the frequency hopping start position can be determined by the following formula:

For more than two hops based inter-slot FH of the redcap UE:

$$RB_{start}=\begin{cases}RB_{start} & i=0\\ (RB_{start}+i*RB_{offset})\bmod\min(N_{BWP}^{size},N_{BW}^{size}) & i=1,2,3,\ldots n\end{cases},$$

where i is the number of hops.

For intra-slot FH of the redcap UE:

$$RB_{start}=\begin{cases}RB_{start} & i=0\\ (RB_{start}+RB_{offset})\bmod\min(N_{BWP}^{size},N_{BW}^{size}) & i=1\end{cases},$$

where i is the number of hops.

For two hops based inter-slot FH of the redcap UE:

$$RB_{start}=\begin{cases}RB_{start} & n_s^u\bmod 2=0\\ (RB_{start}+RB_{offset})\bmod\min(N_{BWP}^{size},N_{BW}^{size}) & n_s^u\bmod 2=1\end{cases},$$

$n_s^u$ is a current slot number.

In the above embodiments, it can be used in scenarios where the redcap UE supports RF retuning between RAR and Msg3.

In an embodiment of the present disclosure, after determining the frequency hopping offset, the frequency hopping service is performed according to the frequency hopping offset.

In the embodiment of the present disclosure, the frequency hopping offset of the redcap UE can be adjusted to avoid a problem of the redcap UE hopping out of a system bandwidth range.

In an embodiment of the present disclosure, when the UE is a non-redcap UE, frequency hopping offsets in a first offset configuration table corresponding to the non-redcap UE are determined according to a BWP of the non-redcap UE; and when the UE is a redcap UE, frequency hopping offsets in a second offset configuration table corresponding to the redcap UE are determined according to a system bandwidth of the redcap UE.

In this embodiment, for intra-slot frequency hopping, the non-redcap UE can use the following first offset configuration table:

TABLE 1

| Number of PRBs for BWP | Offset identification | Offset |
|---|---|---|
| $N_{BWP}^{size} < 50$ | 0 | $\lfloor N_{BWP}^{size}/2\rfloor$ |
| | 1 | $\lfloor N_{BWP}^{size}/4\rfloor$ |
| $N_{BWP}^{size} \geq 50$ | 00 | $\lfloor N_{BWP}^{size}/2\rfloor$ |
| | 01 | $\lfloor N_{BWP}^{size}/4\rfloor$ |
| | 10 | $-\lfloor N_{BWP}^{size}/4\rfloor$ |
| | 11 | Reserved |

In this embodiment, for intra-slot frequency hopping, the redcap UE can use the following second offset configuration table:

TABLE 2

| Number of PRBs for BWP | Offset identification | Offset |
|---|---|---|
| $N_{BWP}^{size} < 50$ | 0 | $\mathrm{Min}(\lfloor N_{BWP}^{size}/2\rfloor, \lfloor N_{BW}^{size}/2\rfloor)$ |

TABLE 2-continued

| Number of PRBs for BWP | Offset identification | Offset |
|---|---|---|
| | 1 | $\mathrm{Min}(\lfloor N_{BWP}^{size}/4 \rfloor, \lfloor N_{BW}^{size}/4 \rfloor)$ |
| $N_{BWP}^{size} \geq 50$ | 00 | $\mathrm{Min}(\lfloor N_{BWP}^{size}/2 \rfloor, \lfloor N_{BW}^{size}/2 \rfloor)$ |
| | 01 | $\mathrm{Min}(\lfloor N_{BWP}^{size}/4 \rfloor, \lfloor N_{BW}^{size}/4 \rfloor)$ |
| | 10 | $-\mathrm{Min}(\lfloor N_{BWP}^{size}/4 \rfloor, \lfloor N_{BW}^{size}/4 \rfloor)$ |
| | 11 | Reserved |

In an embodiment of the present disclosure, the above-mentioned Table 1 and Table 2 may be fixed by a protocol. It can also be configured into the UE by means of a base station indication.

In other embodiments of the present disclosure, for two hops based inter-slot frequency hopping, the non-redcap UE can use the following first offset configuration table:

TABLE 3

| Number of PRBs for BWP | Offset identification | Offset |
|---|---|---|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |
| | 01 | $\lfloor N_{BWP}^{size}/4 \rfloor$ |
| | 10 | $-\lfloor N_{BWP}^{size}/4 \rfloor$ |
| | 11 | Reserved |

In other embodiments of the present disclosure, for two hops based inter-slot frequency hopping, the redcap UE can use the following second offset configuration table:

TABLE 4

| Number of PRBs for BWP | Offset identification | Offset |
|---|---|---|
| $N_{BWP}^{size} < 50$ | 0 | $\mathrm{Min}(\lfloor N_{BWP}^{size}/2 \rfloor, \lfloor N_{BW}^{size}/2 \rfloor)$ |
| | 1 | $\mathrm{Min}(\lfloor N_{BWP}^{size}/4 \rfloor, \lfloor N_{BW}^{size}/4 \rfloor)$ |
| $N_{BWP}^{size} \geq 50$ | 00 | $\mathrm{Min}(\lfloor N_{BWP}^{size}/2 \rfloor, \lfloor N_{BW}^{size}/2 \rfloor)$ |
| | 01 | $\mathrm{Min}(\lfloor N_{BWP}^{size}/4 \rfloor, \lfloor N_{BW}^{size}/4 \rfloor)$ |
| | 10 | $-\mathrm{Min}(\lfloor N_{BWP}^{size}/4 \rfloor, \lfloor N_{BW}^{size}/4 \rfloor)$ |
| | 11 | Reserved |

In an embodiment of the present disclosure, in the offset configuration table (s), frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In an embodiment of the present disclosure, the UE may further be configured with the above-mentioned offset configuration table(s) via a system message.

In the embodiment of the present disclosure, both the non-redcap UE and the redcap UE can use the second offset configuration table.

In an embodiment of the present disclosure, the offset configuration table can further be set for more than two hops.

In other embodiments of the present disclosure, for three hops based inter-slot frequency hopping, the non-redcap UE can use the following first offset configuration table:

TABLE 5

| Number of PRBs for BWP | Offset identification | Offset |
|---|---|---|
| $N_{BWP}^{size} < 50$ | 0 | $\lfloor N_{BWP}^{size}/3 \rfloor$ |
| | 1 | $\lfloor N_{BWP}^{size}/6 \rfloor$ |
| $N_{BWP}^{size} \geq 50$ | 00 | $\lfloor N_{BWP}^{size}/3 \rfloor$ |
| | 01 | $\lfloor N_{BWP}^{size}/6 \rfloor$ |
| | 10 | $-\lfloor N_{BWP}^{size}/3 \rfloor$ |
| | 11 | Reserved |

In other embodiments of the present disclosure, for three hops based inter-slot frequency hopping, the redcap UE can use the following second offset configuration table:

TABLE 6

| Number of PRBs for BWP | Offset identification | Offset |
|---|---|---|
| $N_{BWP}^{size} < 50$ | 0 | $\mathrm{Min}(\lfloor N_{BWP}^{size}/3 \rfloor, \lfloor N_{BW}^{size}/3 \rfloor)$ |
| | 1 | $\mathrm{Min}(\lfloor N_{BWP}^{size}/6 \rfloor, \lfloor N_{BW}^{size}/6 \rfloor)$ |
| $N_{BWP}^{size} \geq 50$ | 00 | $\mathrm{Min}(\lfloor N_{BWP}^{size}/3 \rfloor, \lfloor N_{BW}^{size}/3 \rfloor)$ |
| | 01 | $\mathrm{Min}(\lfloor N_{BWP}^{size}/6 \rfloor, \lfloor N_{BW}^{size}/6 \rfloor)$ |
| | 10 | $-\mathrm{Min}(\lfloor N_{BWP}^{size}/6 \rfloor, \lfloor N_{BW}^{size}/6 \rfloor)$ |
| | 11 | Reserved |

In the embodiment of the present disclosure, the above-mentioned first offset configuration table 5 and second offset configuration table 6 can be specified by a protocol or notified by a system message.

In the embodiment of the present disclosure, the first offset configuration table and the second offset configuration table are further merged. The merged table is applicable to both the redcap UE and the non-redcap UE, as shown in the following table.

TABLE 7

| Number of PRBs for BWP | Offset identification | Offset |
|---|---|---|
| $N^{size}_{BWP} < 50$ | 00 | $\lfloor N^{size}_{BWP}/2 \rfloor$ |
| | 01 | $\lfloor N^{size}_{BWP}/4 \rfloor$ |
| | 10 | $\lfloor N^{size}_{BW}/2 \rfloor$ |
| | 11 | $\lfloor N^{size}_{BW}/4 \rfloor$ |
| $N^{size}_{BWP} \geq 50$ | 000 | $\lfloor N^{size}_{BWP}/2 \rfloor$ |
| | 001 | $\lfloor N^{size}_{BWP}/4 \rfloor$ |
| | 010 | $-\lfloor N^{size}_{BWP}/4 \rfloor$ |
| | 011 | $\lfloor N^{size}_{BW}/2 \rfloor$ |
| | 100 | $\lfloor N^{size}_{BW}/4 \rfloor$ |
| | 101 | $-\lfloor N^{size}_{BW}/4 \rfloor$ |
| | 110 | reserved |
| | 111 | reserved |

In an embodiment of the present disclosure, a plurality of frequency hopping offset value configuration tables may be aggregated into one large table, after which a first offset identification is retrieved as an index value. Since a plurality of frequency hopping offset value configuration tables are aggregated into one large table, it is necessary to extend bits in corresponding dynamic signaling to indicate its index. An extended bit can reuse a TPC (power control) field in an RAR UL grant.

In an embodiment of the present disclosure, when a repetition is required, a coverage is poor, and a terminal generally uses full for the power transmission. At this time, the TPC (power control) field is invalid, so one or more bits of the TPC field can be reused as an extended bit (i.e. the first offset identification).

In an embodiment of the present disclosure, the base station may set a first offset configuration table and a second offset configuration table, or, a first offset configuration table or a second offset configuration table. If a BWP is greater than the system bandwidth of the redcap UE, the base station configures the first offset configuration table and the second offset configuration table. If the BWP is less than or equal to the system bandwidth of the redcap UE, only the first offset configuration table is configured in the base station, and the redcap UE also uses the first offset configuration table.

In an embodiment of the present disclosure, the base station can set a first offset configuration table and a second offset configuration table. The non-redcap UE uses the first offset configuration table to determine the frequency hopping start position, while the redcap UE uses the second offset configuration table to determine the frequency hopping start position.

In an embodiment of the present disclosure, if the offset configuration table is notified by a system message, only the second offset configuration table may be sent in this embodiment, and both the non-redcap UE and the redcap UE use the second offset configuration table to determine the frequency hopping start position. In this way, the base station may not need to distinguish the types of UE.

In an embodiment of the present disclosure, the offset(s) can be set not only by the above-mentioned offset configuration table, but also by a protocol, or may be configured by a system message from the base station.

In an embodiment of the present disclosure, after determining the number of hops, the frequency hopping is performed according to the number of hops.

In the embodiment of the present disclosure, the number of hops of the redcap UE can be adjusted to avoid a problem of the redcap UE hopping out of a system bandwidth range.

Figure 12:
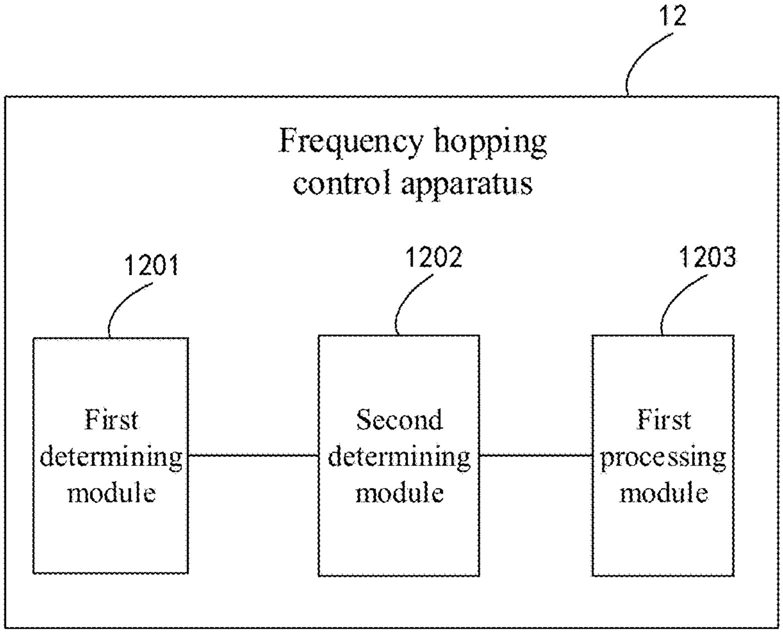
FIG. 12 is a schematic structural diagram of a frequency hopping control apparatus according to an embodiment of the present disclosure.
Figure 13:
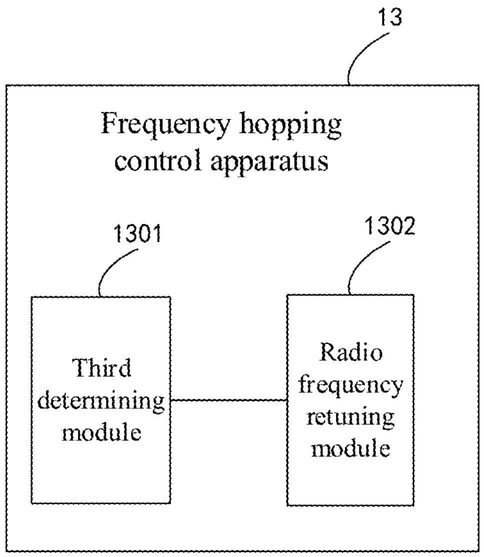
FIG. 13 is a schematic structural diagram of a frequency hopping control apparatus according to an embodiment of the present disclosure.
Figure 14:
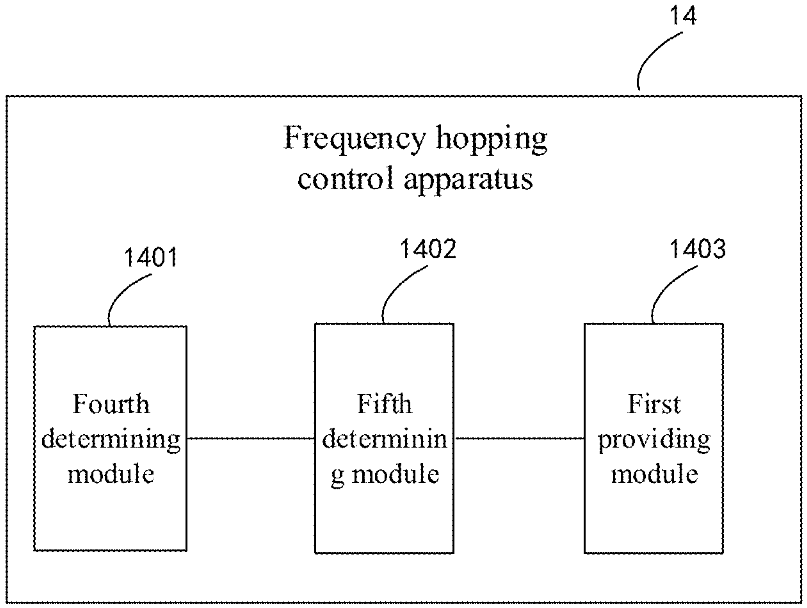
FIG. 14 is a schematic structural diagram of a frequency hopping control apparatus according to an embodiment of the present disclosure.

Corresponding to the frequency hopping control method provided by the above-mentioned embodiments, the present disclosure further provides frequency hopping control apparatuses. Since the frequency hopping control apparatuses provided in embodiments of the present disclosure corresponding to the frequency hopping control methods provided by the above-mentioned embodiments, the implementations in the frequency hopping control methods are also applicable to the frequency hopping control apparatuses provided by the embodiments of the present disclosure, and will not be described in detail in this embodiment. FIG. 12-FIG. 14 are schematic structural diagrams of frequency hopping control apparatuses proposed according to an embodiment of the present disclosure.

FIG. 12 is a schematic structural diagram of a frequency hopping control apparatus according to an embodiment of the present disclosure. The apparatus is performed by a user equipment (UE).

As shown in FIG. 12, frequency hopping control apparatus 12 includes: first determining module 1201, second determining module 1202, and first processing module 1203, where:

The first determining module 1201 is configured to determine a type of a UE. In the embodiment of the present disclosure, the types of UE include a redcap (Reduced capability) UE and a non-redcap UE. In an embodiment of the present disclosure, the redcap UE can be understood as an IoT device with a smaller bandwidth or fewer antennas, while the non-redcap UE can be understood as a regular NR terminal that supports all the features of NR. In an embodiment of the present disclosure, the type of the UE can be determined based on a size of a bandwidth. In an embodiment of the present disclosure, a base station can obtain a bandwidth of the UE, and the type of the UE can be determined according to a bandwidth size of the UE, that is, a redcap UE or a non-redcap UE. In other embodiments of the present disclosure, two types of UE can further be distinguished based on a physical random access channel (PRACH).

The second determining module 1202 is configured to determine one or more frequency hopping parameters according to the type of the UE. In the embodiment of the present disclosure, the frequency hopping parameters include one or more of frequency hopping start position, frequency hopping offset, and a number of hops. In an embodiment of the present disclosure, the hopping parameters are determined according to the type of the UE. Specifically, separate frequency hopping parameters can be set for the redcap UE and separate frequency hopping parameters can also be set for the non-redcap UE, so that the frequency hopping parameters of redcap UE and non-redcap UE are different, thereby avoiding a situation that the redcap UE may hop out of a system bandwidth of the redcap UE during frequency hopping. In another embodiment of the present disclosure, same frequency hopping parameters can also be set for both the redcap UE and the non-redcap UE. The frequency hopping parameters need to take into account the redcap UE to avoid a situation hopping out of a system bandwidth range of the redcap UE. Or, it is possible to maintain current frequency hopping parameters of the non-redcap UE and adjust frequency hopping parameters of the redcap UE.

The first processing module 1203 is configured to perform frequency hopping according to the determined frequency hopping parameters. In the embodiment of the present disclosure, frequency hopping can be performed according to the frequency hopping parameters determined by UE. For example, frequency hopping is performed according to the frequency hopping start position, the frequency hopping offset, and the number of hops.

In the embodiment of the present disclosure, the frequency hopping parameters can be adjusted according to the type of the UE, thereby avoiding a situation of hopping out of a system bandwidth range of a redcap UE.

In an embodiment of the present disclosure, the frequency hopping parameter is a frequency hopping start position.

In an embodiment of the present disclosure, the second determining module 1202 is configured to determine the UE being a redcap UE, determine an initial value of a frequency hopping start position of the UE; and determine the frequency hopping start position according to an initial value of the start frequency hopping.

In an embodiment of the present disclosure, for example, if the determined initial value of the frequency hopping start position is n and n causes a problem of hopping out of a system bandwidth of the redcap UE, it is necessary to adjust n. In another embodiment of the present disclosure, for example, if an initial value of a frequency hopping start position of a nth hop is determined to be "a", and "a" exceeds a maximum system bandwidth supported by the redcap UE, the frequency hopping start position of the nth hop may be changed to a position b of a (n−m)th hop, where b is within the system bandwidth range of the redcap UE, and n>m. In this embodiment, m can be fixed by a protocol or dynamically configured by the base station. m is determined based on the number of hops.

In an embodiment of the present disclosure, determine the initial value of the frequency hopping start position not exceeding the system bandwidth of the UE, the initial value of the frequency hopping start position can be determined as the frequency hopping start position directly.

As shown in FIG. 4, it is a schematic diagram of adjusting a frequency hopping start position according to an embodiment of the present disclosure. As shown in FIG. 4, during Slot3 (slot 3), since a situation that exceeds a UE system bandwidth occurs, it is adjusted, for example, subtracting the adjustment value (for example 2), to fall back into system bandwidth of the redcap UE. Similarly, for Slot4, the adjustment value (for example, 2) can also be subtracted.

In an embodiment of the present disclosure, the second determining module 1202 is configured to determine a system bandwidth of the UE; determine the initial value of the frequency hopping start position exceeding the system bandwidth of the UE, acquire an adjustment value; and adjust the initial value of the frequency hopping start position according to the adjustment value to generate the frequency hopping start position.

In an embodiment of the present disclosure, the second determining module 1202 is configured to determine the initial value of the frequency hopping start position not exceeding the system bandwidth of the UE, determine the initial value of the frequency hopping start position as the frequency hopping start position.

In an embodiment of the present disclosure, the adjustment value is determined by: a protocol; or, a signaling configuration sent by a base station.

In an embodiment of the present disclosure, the second determining module 1202 is configured to determine the UE is a non-redcap UE, take the initial value of the frequency hopping start position as the frequency hopping start position.

In an embodiment of the present disclosure, the second determining module 1202 includes: a unit for acquiring a number of hops, configured to acquire a current number of hops; a unit for generating a current frequency hopping start position, configured to generate a current frequency hopping start position according to the current number of hops; a unit for generating an adjustment coefficient, configured to generate an adjustment coefficient according to the type of the UE; and a unit for generating a frequency hopping start position, configured to generate the frequency hopping start position according to the adjustment coefficient and the current frequency hopping start position.

In the embodiment of the present disclosure, for UE, $$RB_{start} = (RB_{start} + i * RB_{offset}) \bmod N_{BWP}^{size} \quad i = 0, 1, 2, \ldots n$$

can be used as the current frequency hopping start position, where i is the current number of hops, RBstart is the current frequency hopping start position, and RBoffset is an offset.

In an embodiment of the present disclosure, for a non-redcap UE, the adjustment coefficient is $$\bmod N_{BWP}^{size}, \text{ where } N_{BWP}^{size}$$

is a bandwidth part (BWP) of the non-redcap UE.

In an embodiment of the present disclosure, for a redcap UE, the adjustment coefficient can be generated according to a system bandwidth of the redcap UE. In another embodiment of the present disclosure, for the redcap UE, the adjustment coefficient is $$\bmod \min\left(N_{BWP}^{size}, N_{BW}^{size}\right), \text{ where } N_{BWP}^{size}$$

is a bandwidth part (BWP) of the non-redcap UE, and $$N_{BW}^{size}$$

is a system bandwidth of the redcap UE.

In the embodiment of the present disclosure, the adjustment coefficient generated based on mode-taking may further be generated based in other manners, which is not limited by the present disclosure.

In an embodiment of the present disclosure, for multiple frequency hopping positions, frequency hopping start positions of the redcap UE and the non-redcap UE can be determined by the following manner.

For the non-redcap UE, the frequency hopping start position can be calculated using the following formula:

$$RB_{start}=(RB_{start}+i*RB_{offset})\bmod N_{BWP}^{size}\ \ i=0,1,2,\ \ldots\ n,$$

where i is the number of hops.

For the redcap UE, the frequency hopping start position can be calculated using the following formula:

$$RB_{start}=(RB_{start}+i*RB_{offset})\bmod \min\left(N_{BWP}^{size},N_{BW}^{size}\right)\ \ i=0,1,2,\ \ldots\ ,n,$$

where i is the number of hops.

In another embodiment of the present disclosure, for intra-slot frequency hopping and two hops based inter-slot frequency hopping, the frequency hopping start position can further be determined by the following formula.

For the non-redcap UE and intra-slot frequency hopping, the frequency hopping start position can be determined by the following formula:

$$RB_{start}=\begin{cases}RB_{start} & i=0\\ (RB_{start}+RB_{offset})\bmod N_{BWP}^{size} & i=1\end{cases},$$

For the non-redcap UE and two hops based inter-slot frequency hopping, the frequency hopping start position can be determined by the following formula:

$$RB_{start}(n_s^u)=\begin{cases}RB_{start} & n_s^u\bmod 2=0\\ (RB_{start}+RB_{offset})\bmod N_{BWP}^{size} & n_s^u\bmod 2=1\end{cases},$$

For the redcap UE and intra-slot frequency hopping, a frequency hopping start position can be determined by the following formula:

$$RB_{start}=(RB_{start}+i*RB_{offset})\bmod \min\left(N_{BWP}^{size},N_{BW}^{size}\right)\ \ i=0,1,$$

where i is the number of hops.

For the redcap UE and two hops based inter-slot frequency hopping, the frequency hopping start position can be determined by the following formula:

$$RB_{start}=\begin{cases}RB_{start}\bmod\min\left(N_{BWP}^{size},N_{BW}^{size}\right) & n_s^u\bmod 2=0\\ (RB_{start}+RB_{offset})\bmod\min\left(N_{BWP}^{size},N_{BW}^{size}\right) & n_s^u\bmod 2=1\end{cases},$$

where i is the number of hops.

In other embodiments of the present disclosure, more than two hops can also be performed. For example, for the redcap UE, the frequency hopping start position can be determined by the following formula:

For more than two hops based inter-slot FH of the redcap UE:

$$RB_{start}=\begin{cases}RB_{start} & i=0\\ (RB_{start}+i*RB_{offset})\bmod\min\left(N_{BWP}^{size},N_{BW}^{size}\right) & i=1,2,3,\ \ldots\ n\end{cases},$$

where i is the number of hops.

For intra-slot FH of the redcap UE:

$$RB_{start}=\begin{cases}RB_{start} & i=0\\ (RB_{start}+RB_{offset})\bmod\min\left(N_{BWP}^{size},N_{BW}^{size}\right) & i=1\end{cases},$$

where i is the number of hops.

For two hops based inter-slot FH of the redcap UE:

$$RB_{start}=\begin{cases}RB_{start} & n_s^u\bmod 2=0\\ (RB_{start}+RB_{offset})\bmod\min\left(N_{BWP}^{size},N_{BW}^{size}\right) & n_s^u\bmod 2=1\end{cases},$$

is a current slot number.

In the above embodiments, it can be used in scenarios where the redcap UE supports RF retuning between RAR and Msg3.

In the embodiment of the present disclosure, the adjustment coefficient is generated according to a minimum value between the system bandwidth of the redcap UE and the BWP of the non-redcap UE. In another embodiment of the present disclosure, both the redcap UE and the non-redcap UE use a same formula for determining the frequency hopping start position. In this embodiment, since the formulas used for the redcap UE and the non-redcap UE are the same (both using the formula for determining the frequency hopping start position of the redcap UE as shown above), the base station does not need to distinguish between the redcap UE and the non-redcap UE. In another embodiment of the present disclosure, the adjustment coefficient is generated according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the unit for generating an adjustment coefficient includes: a subunit for generating an adjustment coefficient, configured to: if the UE is a non-redcap UE, acquire a bandwidth part (BWP) of the non-redcap UE and generate the adjustment coefficient according to the BWP; and a subunit for acquiring a system bandwidth is configured to: if the UE is a redcap UE, acquire a system bandwidth of the redcap UE and generate the adjustment coefficient according to the system bandwidth.

In an embodiment of the present disclosure, the subunit for acquiring a system bandwidth is configured to: generate the adjustment coefficient according to a minimum value between the system bandwidth of the redcap UE and the BWP of the non-redcap UE.

In an embodiment of the present disclosure, the unit for generating adjustment coefficient is configured to: the generate adjustment coefficient according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the one or more frequency hopping parameters include a frequency hopping offset.

In an embodiment of the present disclosure, the second determining module 1202 includes: a unit for acquiring an offset configuration table, configured to acquire an offset configuration table corresponding to the type of the UE; a unit for acquiring an offset identification unit, configured to acquire an offset identification indicated by the base station;

and a unit for determining frequency hopping offset, configured to determine frequency hopping offset according to the offset identification and the offset configuration table corresponding to the type of the UE.

In an embodiment of the present disclosure, an offset configuration table corresponding to the type of the UE can be acquired first; an offset identification indicated by a base station can be acquired; and the frequency hopping offset can be determined according to the offset identification and the offset configuration table corresponding to the type of the UE.

In an embodiment of the present disclosure, different offset configuration tables are set for different types of UE.

In an embodiment of the present disclosure, the offset configuration table may be specified by a protocol or notified by the base station via a system message.

In an embodiment of the present disclosure, a same offset configuration table can be configured for the non-redcap UE and the redcap UE, and different offset configuration tables can also be configured for the non-redcap UE and the redcap UE. By configuring a same offset configuration table, the redcap UE can be avoided from hopping out of its own system bandwidth.

In an embodiment of the present disclosure, further including: a first frequency hopping offset unit, configured to: if the UE is a non-redcap UE, determine frequency hopping offsets in a first offset configuration table corresponding to the non-redcap UE according to a BWP of the non-redcap UE; and a second frequency hopping offset unit, configured to: if the UE is a redcap UE, determine frequency hopping offsets in a second offset configuration table corresponding to the redcap UE according to a system bandwidth of the redcap UE.

In an embodiment of the present disclosure, the frequency hopping offsets in the second offset configuration table are determined according to a minimum value between the system bandwidth of the redcap UE and the BWP of the non-redcap UE.

In an e on table is determined by: a protocol; or, a signaling configuration sent by a base station.

In an embodiment of the present disclosure, one or more lists may be designed, for example, one list may include frequency hopping parameters such as frequency hopping offset values, number of hops, and FH time domain granularity, or multiple lists may each include a parameter. For example, a first table may include the frequency hopping parameters, a second table may include the number of hops, and a third table may include the FH time domain granularity, which may be specified by a protocol or notified by a system message to enable the UE to acquire the lists and thus acquire at least one of the frequency hopping parameters such as frequency hopping offset values, the number of hops and FH time domain granularity from the one or more lists. In addition, this list may further be pre-configured in a communication device either by a communication protocol of communication standardization organizations (e.g., 3GPP standardization organizations, IEEE, etc.) or by factory settings of the communication device. In one embodiment, when required by the base station, a control signal can be sent to a terminal, indicating a list to be applied in the current communication to notify the terminal to activate the list.

In an embodiment of the present disclosure, both the non-redcap UE and the redcap UE can use the second offset configuration table.

In an embodiment of the present disclosure, in the offset configuration table, frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In this embodiment, for intra-slot frequency hopping, the non-redcap UE can use the following first offset configuration table:

TABLE 1

| Number of PRBs for BWP | Offset identification | Offset |
|---|---|---|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |
| | 01 | $\lfloor N_{BWP}^{size}/4 \rfloor$ |
| | 10 | $-\lfloor N_{BWP}^{size}/4 \rfloor$ |
| | 11 | Reserved |

In this embodiment, for intra-slot frequency hopping, the redcap UE can use the following second offset configuration table:

TABLE 2

| Number of PRBs for BWP | Offset identification | Offset |
|---|---|---|
| $N_{BWP}^{size} < 50$ | 0 | $\text{Min}(\lfloor N_{BWP}^{size}/2 \rfloor, \lfloor N_{BW}^{size}/2 \rfloor)$ |
| | 1 | $\text{Min}(\lfloor N_{BWP}^{size}/4 \rfloor, \lfloor N_{BW}^{size}/4 \rfloor)$ |
| $N_{BWP}^{size} \geq 50$ | 00 | $\text{Min}(\lfloor N_{BWP}^{size}/2 \rfloor, \lfloor N_{BW}^{size}/2 \rfloor)$ |
| | 01 | $\text{Min}(\lfloor N_{BWP}^{size}/4 \rfloor, \lfloor N_{BW}^{size}/4 \rfloor)$ |
| | 10 | $-\text{Min}(\lfloor N_{BWP}^{size}/4 \rfloor, \lfloor N_{BW}^{size}/4 \rfloor)$ |
| | 11 | Reserved |

In an embodiment of the present disclosure, the above-mentioned Table 1 and Table 2 may be fixed by a protocol. It can also be configured into the UE by means of a base station indication.

In other embodiments of the present disclosure, for two hops based inter-slot frequency hopping, the non-redcap UE can use the following first offset configuration table:

TABLE 3

| Number of PRBs for BWP | Offset identification | Offset |
|---|---|---|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |

TABLE 3-continued

| Number of PRBs for BWP | Offset identification | Offset |
|---|---|---|
| | 01 | $\lfloor N_{BWP}^{size}/4 \rfloor$ |
| | 10 | $-\lfloor N_{BWP}^{size}/4 \rfloor$ |
| | 11 | Reserved |

In other embodiments of the present disclosure, for two hops based inter-slot frequency hopping, the redcap UE can use the following second offset configuration table:

TABLE 4

| Number of PRBs for BWP | Offset identification | Offset |
|---|---|---|
| $N_{BWP}^{size} < 50$ | 0 | $\text{Min}(\lfloor N_{BWP}^{size}/2 \rfloor, \lfloor N_{BW}^{size}/2 \rfloor)$ |
| | 1 | $\text{Min}(\lfloor N_{BWP}^{size}/4 \rfloor, \lfloor N_{BW}^{size}/4 \rfloor)$ |
| $N_{BWP}^{size} \geq 50$ | 00 | $\text{Min}(\lfloor N_{BWP}^{size}/2 \rfloor, \lfloor N_{BW}^{size}/2 \rfloor)$ |
| | 01 | $\text{Min}(\lfloor N_{BWP}^{size}/4 \rfloor, \lfloor N_{BW}^{size}/4 \rfloor)$ |
| | 10 | $-\text{Min}(\lfloor N_{BWP}^{size}/4 \rfloor, \lfloor N_{BW}^{size}/4 \rfloor)$ |
| | 11 | Reserved |

In an embodiment of the present disclosure, in the offset configuration table, frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In an embodiment of the present disclosure, the UE may further be configured with the above-mentioned offset configuration tables via a system message.

In the embodiment of the present disclosure, both the non-redcap UE and the redcap UE can use the second offset configuration table.

In an embodiment of the present disclosure, an offset configuration table can also be set for more than hops.

In other embodiments of the present disclosure, for three hops based inter-slot frequency hopping, the non-redcap UE can use the following first offset configuration table:

TABLE 5

| Number of PRBs for BWP | Offset identification | Offset |
|---|---|---|
| $N_{BWP}^{size} < 50$ | 0 | $\lfloor N_{BWP}^{size}/3 \rfloor$ |
| | 1 | $\lfloor N_{BWP}^{size}/6 \rfloor$ |
| $N_{BWP}^{size} \geq 50$ | 00 | $\lfloor N_{BWP}^{size}/3 \rfloor$ |
| | 01 | $\lfloor N_{BWP}^{size}/6 \rfloor$ |

TABLE 5-continued

| Number of PRBs for BWP | Offset identification | Offset |
|---|---|---|
| | 10 | $-\lfloor N_{BWP}^{size}/3 \rfloor$ |
| | 11 | Reserved |

In other embodiments of the present disclosure, for three hops based inter-slot frequency hopping, the redcap UE can use the following second offset configuration table:

TABLE 6

| Number of PRBs for BWP | Offset identification | Offset |
|---|---|---|
| $N_{BWP}^{size} < 50$ | 0 | $\text{Min}(\lfloor N_{BWP}^{size}/3 \rfloor, \lfloor N_{BW}^{size}/3 \rfloor)$ |
| | 1 | $\text{Min}(\lfloor N_{BWP}^{size}/6 \rfloor, \lfloor N_{BW}^{size}/6 \rfloor)$ |
| $N_{BWP}^{size} \geq 50$ | 00 | $\text{Min}(\lfloor N_{BWP}^{size}/3 \rfloor, \lfloor N_{BW}^{size}/3 \rfloor)$ |
| | 01 | $\text{Min}(\lfloor N_{BWP}^{size}/6 \rfloor, \lfloor N_{BW}^{size}/6 \rfloor)$ |
| | 10 | $-\text{Min}(\lfloor N_{BWP}^{size}/6 \rfloor, \lfloor N_{BW}^{size}/6 \rfloor)$ |
| | 11 | Reserved |

In the embodiment of the present disclosure, the above-mentioned first offset configuration table 5 and second offset configuration table 6 can be specified by a protocol or notified by a system message.

In the embodiment of the present disclosure, the first offset configuration table and the second offset configuration table are further merged. The merged table is applicable to both the redcap UE and the non-redcap UE, as shown in the following table.

TABLE 7

| Number of PRBs for BWP | Offset identification | Offset |
|---|---|---|
| $N_{BWP}^{size} < 50$ | 00 | $\lfloor N_{BWP}^{size}/2 \rfloor$ |
| | 01 | $\lfloor N_{BWP}^{size}/4 \rfloor$ |
| | 10 | $\lfloor N_{BW}^{size}/2 \rfloor$ |
| | 11 | $\lfloor N_{BW}^{size}/4 \rfloor$ |
| $N_{BWP}^{size} \geq 50$ | 000 | $\lfloor N_{BWP}^{size}/2 \rfloor$ |
| | 001 | $\lfloor N_{BWP}^{size}/4 \rfloor$ |
| | 010 | $-\lfloor N_{BWP}^{size}/4 \rfloor$ |
| | 011 | $\lfloor N_{BW}^{size}/2 \rfloor$ |
| | 100 | $\lfloor N_{BW}^{size}/4 \rfloor$ |

TABLE 7-continued

| Number of PRBs for BWP | Offset identification | Offset |
|---|---|---|
| | 101 | $-\lfloor N_{BWP}^{size}/4 \rfloor$ |
| | 110 | reserved |
| | 111 | reserved |

In an embodiment of the present disclosure, a plurality of frequency hopping offset value configuration tables may be aggregated into one large table, after which a first offset identification is retrieved as an index value. Since a plurality of frequency hopping offset value configuration tables are aggregated into one large table, it is necessary to extend bits in a corresponding dynamic signaling to indicate its index. An extended bit can reuse a TPC (power control) field in an RAR UL grant.

In an embodiment of the present disclosure, when a repetition is required, a coverage is poor, and a terminal generally uses full power transmission. At this time, the TPC (power control) field is invalid, so the one or more bits of the TPC field can be reused as an extended bit (i.e. the first offset identification).

In an embodiment of the present disclosure, the base station may set a first offset configuration table and a second offset configuration table, or, a first offset configuration table or a second offset configuration table. If a BWP is greater than the system bandwidth of the redcap UE, configure the first offset configuration table and the second offset configuration table in the base station. If the BWP is less than or equal to the system bandwidth of the redcap UE, only the first offset configuration table is configured in the base station, and the redcap UE also uses the first offset configuration table.

In an embodiment of the present disclosure, the base station can set a first offset configuration table and a second offset configuration table. The non-redcap UE uses the first offset configuration table to determine the frequency hopping start position, while the redcap UE uses the second offset configuration table to determine the frequency hopping start position.

In an embodiment of the present disclosure, if the offset configuration table is notified by a system message, only the second offset configuration table may be sent in this embodiment, and both the non-redcap UE and the redcap UE use the second offset configuration table to determine the frequency hopping start position. In this way, the base station may not need to distinguish the types of UE.

In an embodiment of the present disclosure, the offset can be set not only by the above-mentioned offset configuration table, but also by a protocol, or may be configured by a system message of the base station.

In an embodiment of the present disclosure, the frequency hopping parameter is a number of hops.

In an embodiment of the present disclosure, the number of hops supported by the non-redcap UE is greater than the number of hops supported by the redcap UE.

In an embodiment of the present disclosure, the second determining module 1202 includes: a first unit for determining a number of hops of a non-redcap UE, configured to: if the UE is a non-redcap UE, take a first number of hops as the number of hops of the non-redcap UE; and a first unit for determining a number of hops of a redcap UE, configured to: if the UE is a redcap UE, take a second number of hops as the number of hops of the redcap UE, where the first number of hops is greater than the second number of hops.

In the embodiment of the present disclosure, the first number of hops and the second number of hops are configured by a protocol or indicated by a base station.

In the embodiment of the present disclosure, the first number of hops and second number of hops are indicated by a remaining minimum system information (RMSI), random access response (RAR), or downlink control information (DCI) from the base station.

In an embodiment of the present disclosure, the second determining module 1202 includes: a first determining module, configured to determine whether a BWP of a non-redcap UE is greater than a system bandwidth of a redcap UE; a second for determining a number of hops of a non-redcap UE unit, configured to: if greater than the system bandwidth of the redcap UE, take a first preset number as a number of hops of the non-redcap UE, and take a second preset number as a number of hops of the redcap UE, where the first preset number of hops is greater than the second preset number of hops; and a first unit for determining a number of hops of a non-redcap UE and a redcap UE, configured to: if less than or equal to a system bandwidth of the redcap UE, take the first preset number as the number of hops of the non-redcap UE and the redcap UE.

In an embodiment of the present disclosure, the second determining module 1202 includes: a first receiving indication number unit, configured to: receive a first indication number and a second indication number indicated by the base station, where the first indication number is greater than the second indication number; and a second unit for determining a number of hops of a non-redcap UE and a redcap UE, configured to: if a BWP of a non-redcap UE is greater than a system bandwidth of a redcap UE, take the first indication number as a number of hops of the non-redcap UE, and the second indication number as a number of hops of the redcap UE.

In an embodiment of the present disclosure, the second determining module 1202 includes: a second receiving indication number unit, configured to: receive a third indication number indicated by the base station; and a third unit for determining a number of hops of a non-redcap UE and a redcap UE, configured to: if a first BWP of the non-redcap UE is less than or equal to the system bandwidth of the redcap UE, take the third indication number as a number of hops of the non-redcap UE and the redcap UE.

In an embodiment of the present disclosure, the first indication number and second indication number, or third indication number are indicated by an RMSI, an RAR, or a DCI from the base station.

In an embodiment of the present disclosure, the number of hops corresponding to the non-redcap UE is indicated by the base station, and the number of hops corresponding to the redcap UE is specified by a protocol.

In the embodiment of the present disclosure, if the UE is a non-redcap UE, a first number of hops is taken as the number of hops of the non-redcap UE; if the UE is a redcap UE, a second number of hops is taken as the number of hops of the redcap UE, where the first number of hops is greater than the second number of hops.

In the embodiment of the present disclosure, the number of hops supported by the non-redcap UE is greater than the number of hops supported by the redcap UE.

In the embodiment of the present disclosure, the above-mentioned first number of hops and second number of hops may be indicated by a remaining minimum system information (RMSI), random access response (RAR), or downlink control information (DCI) from the base station.

In the embodiment of the present disclosure, the first number of hops and the second number of hops are configured by a protocol or indicated by a base station. In an embodiment of the present disclosure, the base station may broadcast the first number of hops and the second number of hops through RMSI.

In the embodiment of the present disclosure, the number of hops corresponding to the non-redcap UE is indicated by the base station, and the number of hops corresponding to the redcap UE is specified by a protocol.

In another embodiment of the present disclosure, it is determined whether a BWP of a non-redcap UE is greater than a system bandwidth of a redcap UE. If greater than the system bandwidth of the redcap UE, a first preset number is taken as a number of hops of the non-redcap UE, and a second preset number is taken as a number of hops of the redcap UE, where the first preset number of hops is greater than the second preset number of hops. And if less than or equal to a system bandwidth of the redcap UE, the first preset number is taken as the number of hops of the non-redcap UE and the redcap UE.

In another embodiment of the present disclosure, a first indication number and a second indication number indicated by the base station are received, where the first indication number is greater than the second indication number. If a BWP of a non-redcap UE is greater than a system bandwidth of a redcap UE, the first indication number is taken as a number of hops of the non-redcap UE, and the second indication number is taken as a number of hops of the redcap UE.

In another embodiment of the present disclosure, a third indication number is received from the base station. If a first BWP of the non-redcap UE is less than or equal to a second BWP of the redcap UE, the third indication number is taken as a number of hops of the non-redcap UE and the redcap UE.

It should be noted that the above-mentioned first indication number, second indication number, or third indication number are indicated by an RMSI, an RAR, or a DCI from the base station.

In an embodiment of the present disclosure, a preset value, for example 0, can also be notified or set for the redcap UE, that is, the redcap UE does not perform frequency hopping.

In this embodiment, intra-slot frequency hopping may be applied as well as inter-slot frequency hopping.

In an embodiment of the present disclosure, the number of hops of the non-redcap UE can be configured by the base station, and the number of hops of the redcap UE can also be set to a fixed value. In an embodiment of the present disclosure, a value configured by the base station may be greater than a preset value specified by a protocol for the redcap UE.

FIG. 13 is a schematic structural diagram of a frequency hopping control apparatus according to an embodiment of the present disclosure. The apparatus is performed by a UE.

As shown in FIG. 13, frequency hopping control apparatus 13 includes: third determining module 1301 and radio frequency retuning module 1302, where:

- the third determining module 1301 is configured to confirm a position of a next hop of the redcap UE. As shown in FIG. 9A, it is a schematic diagram of performing radio frequency retuning according to an embodiment of the present disclosure. As shown in FIG. 9A, a next hop time domain position of the redcap UE is Slot3.

The radio frequency retuning module 1302 is configured to: perform radio frequency retuning if a frequency domain position of the next hop exceeds a frequency domain position where a current operating bandwidth of the redcap is located, so that an operating bandwidth of the redcap UE hops to a frequency domain position where the next hop is located. Further referring to FIG. 9A, the next hop frequency domain position of the redcap UE exceeds a frequency domain range where a current operating bandwidth of the redcap UE is located. Therefore, it may be necessary to perform RF retuning on the redcap UE, so that the operating bandwidth of the redcap UE hops to the frequency domain position where the next hop is located, for example a frequency domain position corresponding to Slot4 in FIG. 9A.

In the embodiment of the present disclosure, a time interval for radio frequency retuning is specified by a protocol as a fixed value, or indicated by a base station.

In an embodiment of the present disclosure, the time interval is indicated by a system message, a media access control control element (MAC CE), or downlink control information (DCI) signaling.

As shown in FIG. 9B, it is another schematic diagram of performing radio frequency retuning according to an embodiment of the present disclosure. The redcap UE hops from Hop#0 to Hop#1 by means of RF retuning.

In the embodiment of the present disclosure, for intra-slot frequency hopping, if the RF retuning solution of the embodiment of the present disclosure is adopted, the RF retuning time+number of symbols for PUSCH<=preset number of symbols, e.g., 14, can be made for physical uplink shared channel (PUSCH) time domain resource allocation.

FIG. 14 is a schematic structural diagram of a frequency hopping control apparatus according to an embodiment of the present disclosure. The apparatus is performed by a base station.

As shown in FIG.14, frequency hopping control apparatus 14 includes: fourth determining module 1401, fifth determining module 1402, and first providing module 1403, where:

- the fourth determining module 1401 is configured to determine a type of a UE;
- the fifth determining module 1402 is configured to determine one or more frequency hopping parameters of the UE according to the type of the UE;
- the first provision module 1403 is configured to provide a frequency hopping service of the UE according to the determined frequency hopping parameters.

In an embodiment of the present disclosure, the frequency hopping parameter is a frequency hopping start position.

In an embodiment of the present disclosure, the fifth determining module 1402 is configured to determine the UE being a redcap UE, determine an initial value of a frequency hopping start position of the UE; and determine the frequency hopping start position of the UE according to an initial value of the start frequency hopping of the UE.

In an embodiment of the present disclosure, the fifth determining module 1402 is configured to determine a system bandwidth of the UE; determine the initial value of the frequency hopping start position exceeding the system bandwidth of the UE, acquire an adjustment value; and adjust the initial value of the frequency hopping start position according to the adjustment value to generate the frequency hopping start position of the UE.

In an embodiment of the present disclosure, the fifth determining module 1402 is configured to determine the initial value of the frequency hopping start position not exceeding the system bandwidth of the UE, determine the initial value of the frequency hopping start position as the frequency hopping start position of the UE.

In an embodiment of the present disclosure, the adjustment value is determined by: a protocol; or, sending signaling to the UE for configuration.

In an embodiment of the present disclosure, the fifth determining module 1402 is configured to determine the UE is a non-redcap UE, take the initial value of the frequency hopping start position as the frequency hopping start position of the UE.

In an embodiment of the present disclosure, the fifth determining module 1402 includes: a unit for acquiring a number of hops of the UE, configured to acquire a current number of hops of the UE; a unit for generating a current frequency hopping start position of the UE, configured to generate a current frequency hopping start position of the UE according to the current number of hops; a unit for generating an adjustment coefficient, configured to generate an adjustment coefficient according to the type of the UE; and a unit for generating a frequency hopping start position of the UE, configured to generate the frequency hopping start position of the UE according to the adjustment coefficient and the current frequency hopping start position.

In an embodiment of the present disclosure, the unit for generating an adjustment coefficient is configured to: if the UE is a non-redcap UE, acquire a bandwidth part (BWP) of the non-redcap UE and generate the adjustment coefficient according to the BWP; and if the UE is a redcap UE, acquire a system bandwidth of the redcap UE and generate the adjustment coefficient according to the system bandwidth.

In an embodiment of the present disclosure, the unit for generating an adjustment coefficient is configured to: generate the adjustment coefficient according to a minimum value between the system bandwidth of the redcap UE and the BWP of the non-redcap UE.

In an embodiment of the present disclosure, the unit for generating an adjustment coefficient is configured to: generate the adjustment coefficient according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the one or more frequency hopping parameters are frequency hopping offsets.

In an embodiment of the present disclosure, the fifth determining module 1402 includes: a first sending unit, configured to send an offset configuration table corresponding to the type of the UE to the UE; and a second sending unit, configured to: send an offset identification to the UE.

In an embodiment of the present disclosure, further including: a unit for determining a first offset configuration table corresponding to a non-redcap UE, configured to: if the UE is a non-redcap UE, determine frequency hopping offsets in a first offset configuration table corresponding to the non-redcap UE according to a BWP of the non-redcap UE; and a unit for determining a second offset configuration table corresponding to a UE, configured to: if the UE is a redcap UE, determine frequency hopping offsets in a second offset configuration table corresponding to the redcap UE according to a system bandwidth of the redcap UE.

In an embodiment of the present disclosure, the frequency hopping offsets in the second offset configuration table are determined according to a minimum value between the system bandwidth of the redcap UE and the BWP of the non-redcap UE.

In an embodiment of the present disclosure, the offset configuration table is determined by: a protocol; or, sending signaling to the UE for configuration.

In an embodiment of the present disclosure, both the non-redcap UE and the redcap UE can use the second offset configuration table.

In an embodiment of the present disclosure, in the offset configuration table, frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In an embodiment of the present disclosure, the frequency hopping parameter is a number of hops.

In an embodiment of the present disclosure, the number of hops supported by the non-redcap UE is greater than the number of hops supported by the redcap UE.

In an embodiment of the present disclosure, the fifth determining module 1402 includes: a third unit for determining a number of hops of a non-redcap UE, configured to: if the UE is a non-redcap UE, take a first number of hops as the number of hops of the non-redcap UE; and a second unit for determining a number of hops of a redcap UE, configured to: if the UE is a redcap UE, take a second number of hops as the number of hops of the redcap UE, where the first number of hops is greater than the second number of hops.

In the embodiment of the present disclosure, the first number of hops and the second number of hops are configured by a protocol or indicated by a base station.

In the embodiment of the present disclosure, the first number of hops and second number of hops are indicated by a remaining minimum system information (RMSI), random access response (RAR), or downlink control information (DCI) from the base station.

In an embodiment of the present disclosure, the fifth determining module 1402 includes: a second determining module, configured to determine whether a BWP of a non-redcap UE is greater than a system bandwidth of a redcap UE; a fourth for determining a number of hops of a non-redcap UE, configured to: if greater than the system bandwidth of the redcap UE, take a first preset number as a number of hops of the non-redcap UE, and take a second preset number as a number of hops of the redcap UE, where the first preset number of hops is greater than the second preset number of hops; and a fourth unit for determining a number of hops of a non-redcap UE and a redcap UE, configured to: if less than or equal to a system bandwidth of the redcap UE, take the first preset number as the number of hops of the non-redcap UE and the redcap UE.

In an embodiment of the present disclosure, the fifth determining module 1402 includes: a third sending unit, configured to: send a first indication number and a second indication number, where the first indication number is greater than the second indication number; where, if a BWP of a non-redcap UE is greater than a system bandwidth of a redcap UE, take the first indication number as a number of hops of the non-redcap UE, and take the second indication number as a number of hops of the redcap UE.

In an embodiment of the present disclosure, the fifth determining module 1402 includes: a fourth sending unit, configured to: send a third indication number, where if a first BWP of the non-redcap UE is less than or equal to the system bandwidth of the redcap UE, taking the third indication number as a number of hops of the non-redcap UE and the redcap UE.

In an embodiment of the present disclosure, the first indication number and second indication number, or third indication number are indicated by an RMSI, an RAR, or a DCI from the base station.

In an embodiment of the present disclosure, the number of hops corresponding to the non-redcap UE is indicated by the base station, and the number of hops corresponding to the redcap UE is specified by a protocol.

According to a frequency hopping control apparatus of the embodiment of the present disclosure, a type of a UE is determined; one or more frequency hopping parameters are determined according to the type of the UE; and frequency hopping is performed according to the determined frequency hopping parameters. Therefore, the frequency hopping parameters can be adjusted according to the type of the UE, thereby avoiding a situation of hopping out of a system bandwidth range of a redcap UE.

According to an embodiment of the present disclosure, the present disclosure further provides a communication device and a readable storage medium.

Figure 15:
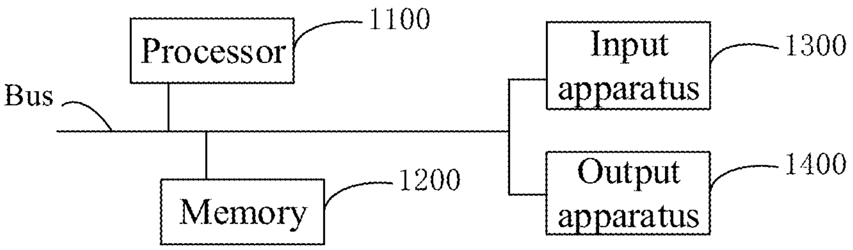
FIG.15 is a block diagram of a communication device of a frequency hopping control method according to an embodiment of the present disclosure.

As shown in FIG. 15, it is a block diagram of a communication device of a frequency hopping control method according to an embodiment of the present disclosure. A communication device is intended to represent various forms of digital computers, such as a laptop computer, a desktop computer, a workstation, a personal digital assistant, a server, a blade server, a mainframe computer, and other suitable computers. The communication device may further represent various forms of mobile apparatuses, such as a personal digital processing, a cellular phone, a smart phones, a wearable device and other similar computing apparatuses. The components shown herein, their connections and relationships, and their functions are only examples, and are not intended to limit the implementation of the present disclosure described and/or required herein.

As shown in FIG. 15, the communication device includes: one or more processors 1100, memory 1200, and interfaces for connecting various components, including a high-speed interface and a low-speed interface. Each component is interconnected by different buses, and can be installed on a common motherboard or in other ways as needed. A processor may process instructions executed within a communication device, including instructions stored in or on a memory to display graphical information of a GUI on an external input/output apparatus (such as a display device coupled to an interface). In other embodiments, a plurality of processors and/or a plurality of buses may be used with a plurality of memories and a plurality of memories, if necessary. Similarly, a plurality of communication devices can be connected, and each device provides some necessary operations (for example, as a server array, a group of blade servers, or a multiprocessor system). A processor 1100 is taken as an example in FIG. 15.

A memory 1200 is a non-transitory computer-readable storage medium provided by the present disclosure. The memory stores instructions executable by at least one processor to make the at least one processor execute the frequency hopping control method provided by the present disclosure. The non-transitory computer-readable storage medium of the present disclosure stores computer instructions for causing a computer to execute the frequency hopping control method provided by the present disclosure.

As a non-transitory computer-readable storage medium, the memory 1200 can be used to store non-transitory software programs, non-transitory computer-executable programs and modules, such as program instructions/modules corresponding to the frequency hopping control method in the embodiment of the present disclosure (for example, the first determining module 1201, the second determining module 1202 and the first processing module 1203 shown in FIG. 12, or the third determining module 1301 and the retuning module 1302 shown in FIG. 13, or the fourth determining module 1401, the fifth determining module 1402, and the first providing module 1403 shown in FIG. 14). The processor 1100 executes various functional applications and data processing of a server by running non-transitory software programs, instructions and modules stored in the memory 1200, i.e., implementing the frequency hopping control method in the method embodiments described above.

The memory 1200 may include a storage program area and a storage data area, where the storage program area may store an operating system and an application program required by at least one function. The storage data area may store data created according to the use of a positioning communication device and the like. In addition, the memory 1200 may include a high-speed random access memory and may further include a non-transitory memory, for example, at least one disk memory device, flash memory device, or other non-transitory solid-state memory devices. In some examples, the memory 1200 may optionally include memories remotely located relative to the processor 1100, and these remote memories may be connected to the positioning communication device through a network. Examples of the above networks include, but are not limited to, an Internet, an intranet, a local area network, a mobile communication network, and combinations thereof.

The communication device for frequency hopping may further include input apparatus 1300 and output apparatus 1400. The processor 1100, the memory 1200, the input apparatus 1300, and the output apparatus 1400 may be connected by a bus or other means, with the connection via a bus being used as an example in FIG. 15.

The input apparatus 1300 can receive input digital or character information and generate key signal input related to user setting and function control of positioning communication device, such as a touch screen, a keypad, a mouse, a track pad, a touch pad, a pointing stick, one or more mouse buttons, a trackball, a joystick and other input apparatuses. The output apparatus 1400 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display and a plasma display. In some embodiments, the display device may be a touch screen.

Various embodiments of the systems and techniques described herein may be implemented in a digital electronic circuit system, an integrated circuit system, a specialized ASIC (application specific integrated circuit), a computer hardware, a firmware, a software, and/or combinations thereof. These various implementation may include: implementing in one or more computer programs that can be executed and/or interpreted on a programmable system including at least one programmable processor, which may be a special-purpose or general-purpose programmable processor and can receive data and instructions from a storage system, at least one input apparatus, and at least one output apparatus, and transmit data and instructions to the storage system, the at least one input apparatus, and the at least one output apparatus. These computing programs (also called programs, software, software applications, or codes) include machine instructions of a programmable processor, and these computing programs can be implemented using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including machine-readable media that receive machine instructions as machine-readable signals. The term "machine-readable signal" refers to any signal used to provide machine instructions and/or data to the programmable processor.

In order to provide interaction with users, systems and techniques described herein can be implemented on a computer having: a display apparatus (for example, a CRT (cathode ray tube) or an LCD (liquid crystal display) monitor) for displaying information to users; and a keyboard and a pointing apparatus (for example, a mouse or a trackball) through which a user can provide input to the computer. Other kinds of apparatuses can also be used to provide interaction with users. For example, a feedback provided to the user can be any form of sensory feedback (for example, visual feedback, auditory feedback, or tactile feedback); and an input from the user can be received in any form (including acoustic input, voice input or tactile input).

The systems and techniques described herein may be implemented in a computing system that includes a backend component (e.g., as a data server), or a computing system that includes a middleware component (e.g., an application server), or a computing system that includes a frontend component (e.g., a user computer having a graphical user interface or a web browser through which a user may interact with implementations of the systems and techniques described herein), or any combination of such backend component, middleware component, or frontend component. Components of the system can be interconnected by any form or medium of digital data communication (for example, a communication network). Examples of the communication network include: a local area network (LAN), a wide area network (WAN) and an Internet.

A computer system may include a client and a server. The client and server are generally far away from each other and usually interact through a communication network. A relationship between client and server is generated by computer programs that run on a corresponding computer and have a client-server relationship with each other.

An embodiment of a first aspect of the present disclosure proposes a frequency hopping control method, which is performed by a user equipment (UE), including: determining a type of a UE; determining one or more frequency hopping parameters according to the type of the UE; and performing frequency hopping according to the determined frequency hopping parameters.

In an embodiment of the present disclosure, the frequency hopping parameter is a frequency hopping start position.

In an embodiment of the present disclosure, the determining the frequency hopping start position according to the type of the UE includes: determining the UE being a redcap UE, determining an initial value of a frequency hopping start position of the UE; and determining the frequency hopping start position according to an initial value of the start frequency hopping.

In an embodiment of the present disclosure, the determining the frequency hopping start position according to the initial value of the frequency hopping start position includes: determining a system bandwidth of the UE; determining to the initial value of the frequency hopping start position exceeding the system bandwidth of the UE, acquiring an adjustment value; and adjusting the initial value of the frequency hopping start position according to the adjustment value to generate the frequency hopping start position.

In an embodiment of the present disclosure, further including: determining the initial value of the frequency hopping start position not exceeding the system bandwidth of the UE, determining the initial value of the frequency hopping start position as the frequency hopping start position.

In an embodiment of the present disclosure, the adjustment value is determined by: a protocol; or, a signaling configuration sent by a base station.

In an embodiment of the present disclosure, further including: determining the UE being a non-redcap UE, taking the initial value of the frequency hopping start position as the frequency hopping start position.

In an embodiment of the present disclosure, the determining the frequency hopping start position according to the type of the UE includes: acquiring a current number of hops; generating a current frequency hopping start position according to the current number of hops; generating an adjustment coefficient according to the type of the UE; and generating the frequency hopping start position according to the adjustment coefficient and the current frequency hopping start position.

In an embodiment of the present disclosure, the generating the adjustment coefficient according to the type of the UE includes: if the UE is a non-redcap UE, acquire a bandwidth part (BWP) of the non-redcap UE and generating the adjustment coefficient according to the BWP; or if the UE is a redcap UE, acquiring a system bandwidth of the redcap UE and generating the adjustment coefficient according to the system bandwidth.

In an embodiment of the present disclosure, the generating the adjustment coefficient according to the system bandwidth includes: generating the adjustment coefficient according to a minimum value between the system bandwidth of the redcap UE and the BWP of the non-redcap UE.

In an embodiment of the present disclosure, the generating the adjustment coefficient according to the type of the UE includes: generating the adjustment coefficient according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the one or more frequency hopping parameters include a frequency hopping offset.

In an embodiment of the present disclosure, the determining the frequency hopping offset according to the type of the UE includes: acquiring an offset configuration table corresponding to the type of the UE; acquiring an offset identification indicated by a base station; and determining the frequency hopping offset according to the offset identification and the offset configuration table corresponding to the type of the UE.

In an embodiment of the present disclosure, further including: if the UE is a non-redcap UE, determining frequency hopping offsets in a first offset configuration table corresponding to the non-redcap UE according to a BWP of the non-redcap UE; or if the UE is a redcap UE, determining frequency hopping offsets in a second offset configuration table corresponding to the redcap UE according to a system bandwidth of the redcap UE.

In an embodiment of the present disclosure, the frequency hopping offsets in the second offset configuration table are determined according to a minimum value between the system bandwidth of the redcap UE and the BWP of the non-redcap UE.

In an embodiment of the present disclosure, the offset configuration table is determined by: a protocol; or, a signaling configuration sent by a base station.

In an embodiment of the present disclosure, both the non-redcap UE and the redcap UE can use the second offset configuration table.

In an embodiment of the present disclosure, in the offset configuration table, frequency hopping offsets corresponding to a non-redcap UE are determined by a BWP of the non-redcap UE, or frequency hopping offsets corresponding to a redcap UE are determined by a minimum value between the BWP of the non-redcap UE and a system bandwidth of the redcap UE.

In an embodiment of the present disclosure, the one or more frequency hopping parameters include a number of hops.

In an embodiment of the present disclosure, the number of hops supported by the non- redcap UE is greater than the number of hops supported by the redcap UE.

In an embodiment of the present disclosure, the determining the number of hops according to the type of the UE includes: if the UE is a non-redcap UE, taking a first number of hops as the number of hops of the non-redcap UE; or if the UE is a redcap UE, taking a second number of hops as the number of hops of the redcap UE, where the first number of hops is greater than the second number of hops.

In the embodiment of the present disclosure, the first number of hops and the second number of hops are configured by a protocol or indicated by a base station.

In the embodiment of the present disclosure, the first number of hops and second number of hops are indicated by a remaining minimum system information (RMSI), random access response (RAR), or downlink control information (DCI) from the base station.

In an embodiment of the present disclosure, the determining the number of hops according to the type of the UE includes: determining whether a BWP of a non-redcap UE is greater than a system bandwidth of a redcap UE; if greater than the system bandwidth of the redcap UE, taking a first preset number as a number of hops of the non-redcap UE, and taking a second preset number as a number of hops of the redcap UE, where the first preset number of hops is greater than the second preset number of hops; and if less than or equal to a system bandwidth of the redcap UE, taking the first preset number as the number of hops of the non-redcap UE and the redcap UE.

In an embodiment of the present disclosure, the determining the number of hops according to the type of the UE includes: receiving a first indication number and a second indication number indicated by the base station, where the first indication number is greater than the second indication number; if a BWP of a non-redcap UE is greater than a system bandwidth of a redcap UE, taking the first indication number as a number of hops of the non-redcap UE, and taking the second indication number as a number of hops of the redcap UE.

In an embodiment of the present disclosure, the determining the number of hops according to the type of the UE includes: receiving a third indication number indicated by the base station; if a first BWP of the non-redcap UE is less than or equal to a second BWP of the redcap UE, taking the third indication number as a number of hops of the non-redcap UE and the redcap UE.

In an embodiment of the present disclosure, the first indication number and second indication number, or third indication number are indicated by an RMSI, an RAR, or a DCI from the base station.

In an embodiment of the present disclosure, the number of hops corresponding to the non-redcap UE is indicated by the base station, or the number of hops corresponding to the redcap UE is specified by a protocol.

An embodiment of a second aspect of the present disclosure proposes a frequency hopping control method, which is performed by a redcap UE, including: confirming a position of a next hop of the redcap UE; if a frequency domain position of the next hop exceeds a frequency domain position where a current operating bandwidth of the redcap is located, performing radio frequency (RF) retuning, such that an operating bandwidth of the redcap UE hops to a frequency domain position where the next hop is located.

In the embodiment of the present disclosure, a time interval for radio frequency retuning is specified by a protocol as a fixed value, or indicated by a base station.

In an embodiment of the present disclosure, the time interval is indicated by a system message, a media access control control element (MAC CE), or downlink control information (DCI) signaling.

An embodiment of a third aspect of the present disclosure proposes a frequency hopping control method, which is performed by a base station, including: determining a type of a UE; determining one or more frequency hopping parameters of the UE according to the type of the UE; and providing a frequency hopping service for the UE according to the determined frequency hopping parameters of the UE.

In an embodiment of the present disclosure, the frequency hopping parameter is a frequency hopping start position.

In an embodiment of the present disclosure, the determining the frequency hopping start position of the UE according to the type of the UE includes: determining the UE being a redcap UE, determining an initial value of a frequency hopping start position of the UE; and determining the frequency hopping start position according to an initial value of the start frequency hopping.

In an embodiment of the present disclosure, the determining the frequency hopping start position of the UE according to the initial value of the frequency hopping start position includes: determining a system bandwidth of the UE; determining the initial value of the frequency hopping start position exceeding the system bandwidth of the UE, acquiring an adjustment value; and adjusting the initial value of the frequency hopping start position according to the adjustment value to generate the frequency hopping start position.

In an embodiment of the present disclosure, further including: determining the initial value of the frequency hopping start position not exceeding the system bandwidth of the UE, determining the initial value of the frequency hopping start position as the frequency hopping start position of the UE.

In an embodiment of the present disclosure, the adjustment value is determined by: a protocol; or, sending signaling to the UE for configuration.

In an embodiment of the present disclosure, further including: determining the UE being a non-redcap UE, taking the initial value of the frequency hopping start position as the frequency hopping start position of the UE.

In an embodiment of the present disclosure, the determining the frequency hopping start position of the UE according to the type of the UE includes: acquiring a current number of hops of the UE; generating a current frequency hopping start position of the UE according to the current number of hops; generating an adjustment coefficient according to the type of the UE; and generating the frequency hopping start position of the UE according to the adjustment coefficient and the current frequency hopping start position.

In an embodiment of the present disclosure, the generating the adjustment coefficient according to the type of the UE includes: if the UE is a non-redcap UE, acquire a bandwidth part (BWP) of the non-redcap UE and generating the adjustment coefficient according to the BWP; and if the UE is a redcap UE, acquiring a system bandwidth of the redcap UE and generating the adjustment coefficient according to the system bandwidth.

In an embodiment of the present disclosure, the generating the adjustment coefficient according to the system bandwidth includes: generating the adjustment coefficient according to a minimum value between the system bandwidth of the redcap UE and the BWP of the non-redcap UE.

In an embodiment of the present disclosure, the generating the adjustment coefficient according to the type of the UE includes: generating the adjustment coefficient according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the one or more frequency hopping parameters are frequency hopping offsets.

In an embodiment of the present disclosure, the determining the frequency hopping offsets of the UE according to the type of the UE includes: sending an offset configuration table corresponding to the type of the UE to the UE; and sending an offset identification to the UE.

In an embodiment of the present disclosure, further including: if the UE is a non-redcap UE, determining frequency hopping offsets in a first offset configuration table corresponding to the non-redcap UE according to a BWP of the non-redcap UE; and if the UE is a redcap UE, determining frequency hopping offsets in a second offset configuration table corresponding to the redcap UE according to a system bandwidth of the redcap UE.

In an embodiment of the present disclosure, the frequency hopping offsets in the second offset configuration table are determined according to a minimum value between the system bandwidth of the redcap and the BWP of the non-redcap UE.

In an embodiment of the present disclosure, the offset configuration table is determined by: a protocol; or, sending signaling to the UE for configuration.

In an embodiment of the present disclosure, both the non-redcap UE and the redcap UE can use the second offset configuration table.

In an embodiment of the present disclosure, in the offset configuration table, frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In an embodiment of the present disclosure, the frequency hopping parameter is a number of hops.

In an embodiment of the present disclosure, the number of hops supported by the non-redcap UE is greater than the number of hops supported by the redcap UE.

In an embodiment of the present disclosure, the determining the number of hops of the UE according to the type of the UE includes: if the UE is a non-redcap UE, taking a first number of hops as the number of hops of the non-redcap UE; if the UE is a redcap UE, taking a second number of hops as the number of hops of the redcap UE, where the first number of hops is greater than the second number of hops.

In the embodiment of the present disclosure, the first number of hops and the second number of hops are configured by a protocol or indicated by a base station.

In the embodiment of the present disclosure, the first number of hops and second number of hops are indicated by remaining minimum system information (RMSI), random access response (RAR), or downlink control information (DCI) from the base station.

In an embodiment of the present disclosure, the determining the number of hops of the UE according to the type of the UE includes: determining whether a BWP of a non-redcap UE is greater than a system bandwidth of a redcap UE; if greater than the system bandwidth of the redcap UE, taking a first preset number as a number of hops of the non-redcap UE, and taking a second preset number as a number of hops of the redcap UE, where the first preset number of hops is greater than the second preset number of hops; and if less than or equal to a system bandwidth of the redcap UE, taking the first preset number as the number of hops of the non-redcap UE and the redcap UE.

In an embodiment of the present disclosure, the determining the number of hops of the UE according to the type of the UE includes: sending a first indication number and a second indication number, where the first indication number is greater than the second indication number; if a BWP of a non-redcap UE is greater than a system bandwidth of a redcap UE, taking the first indication number as a number of hops of the non-redcap UE, and taking the second indication number as a number of hops of the redcap UE.

In an embodiment of the present disclosure, the determining the number of hops according to the type of the UE includes: sending a third indication number indicated by the base station; if a first BWP of the non-redcap UE is less than or equal to a second BWP of the redcap UE, taking the third indication number as a number of hops of the non-redcap UE and the redcap UE.

In an embodiment of the present disclosure, the first indication number and second indication number, or third indication number are indicated by an RMSI, an RAR, or a DCI from the base station.

In an embodiment of the present disclosure, the number of hops corresponding to the non-redcap UE is indicated by the base station, and the number of hops corresponding to the redcap UE is specified by a protocol.

An embodiment of a fourth aspect of the present disclosure proposes a frequency hopping control apparatus, which is performed by a base station, including:

- a first determining module, configured to determine a type of a UE;
- a second determining module, configured to determine one or more frequency hopping parameters according to the type of the UE;
- a first processing module, configured to perform frequency hopping according to the determined frequency hopping parameters.

In an embodiment of the present disclosure, the frequency hopping parameter is a frequency hopping start position.

In an embodiment of the present disclosure, the second determining module is configured to: determining the UE being a redcap UE, determine an initial value of a frequency hopping start position of the UE; and determine the frequency hopping start position according to an initial value of the start frequency hopping.

In an embodiment of the present disclosure, the second determining module is configured to: determine a system bandwidth of the UE; determining the initial value of the frequency hopping start position exceeding the system bandwidth of the UE, acquire an adjustment value; and adjust the initial value of the frequency hopping start position according to the adjustment value to generate the frequency hopping start position.

In an embodiment of the present disclosure, the second determining module is configured to: determining the initial value of the frequency hopping start position not exceeding the system bandwidth of the UE, determine the initial value of the frequency hopping start position as the frequency hopping start position.

In an embodiment of the present disclosure, the adjustment value is determined by: a protocol; or, a signaling configuration sent by a base station.

In an embodiment of the present disclosure, the second determining module is configured to: determining the UE being a non-redcap UE, take the initial value of the frequency hopping start position as the frequency hopping start position.

In an embodiment of the present disclosure, the second determining module includes: a unit for acquiring a number of hops, configured to: acquire a current number of hops; a unit for generating a current frequency hopping start position, configured to: generate a current frequency hopping start position according to the current number of hops; a unit for generating an adjustment coefficient, configured to: generate an adjustment coefficient according to the type of the UE; and a unit for generating a frequency hopping start position, configured to: generate the frequency hopping start position according to the adjustment coefficient and the current frequency hopping start position.

In an embodiment of the present disclosure, the unit for generating an adjustment coefficient is configured to: if the UE is a non-redcap UE, acquire a bandwidth part (BWP) of the non-redcap UE and generate the adjustment coefficient according to the BWP; and a subunit for acquiring a system bandwidth, configured to: if the UE is a redcap UE, acquire a system bandwidth of the redcap UE and generate the adjustment coefficient according to the system bandwidth.

In an embodiment of the present disclosure, the subunit for acquiring a system bandwidth is configured to: generate the adjustment coefficient according to a minimum value between the system bandwidth of the redcap UE and the BWP of the non-redcap UE.

In an embodiment of the present disclosure, the unit for generating an adjustment coefficient is configured to: generate the adjustment coefficient according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the one or more frequency hopping parameters include a frequency hopping offset.

In an embodiment of the present disclosure, the second determining module includes: a unit for acquiring an offset configuration table, configured to acquire an offset configuration table corresponding to the type of the UE; a unit for acquiring an offset identification unit, configured to acquire an offset identification indicated by the base station; and a unit for determining the frequency hopping offset, configured to determine frequency hopping offsets according to the offset identification and the offset configuration table corresponding to the type of the UE.

In an embodiment of the present disclosure, further including: a first frequency hopping offset unit, configured to: if the UE is a non-redcap UE, determine frequency hopping offsets in a first offset configuration table corresponding to the non-redcap UE according to a BWP of the non-redcap UE; and a second frequency hopping offset unit, configured to: if the UE is a redcap UE, determine frequency hopping offsets in a second offset configuration table corresponding to the redcap UE according to a system bandwidth of the redcap UE.

In an embodiment of the present disclosure, the frequency hopping offsets in the second offset configuration table are determined according to a minimum value between the system bandwidth of the redcap and the BWP of the non-redcap UE.

In an embodiment of the present disclosure, the offset configuration table is determined by: a protocol; or, a signaling configuration sent by a base station.

In an embodiment of the present disclosure, both the non-redcap UE and the redcap UE can use the second offset configuration table.

In an embodiment of the present disclosure, in the offset configuration table, frequency hopping offsets corresponding to a non-redcap UE are determined by a BWP of the non-redcap UE, or frequency hopping offsets corresponding to a redcap UE are determined by a minimum value between the BWP of the non-redcap UE and a system bandwidth of the redcap UE.

In an embodiment of the present disclosure, the frequency hopping parameter is a number of hops.

In an embodiment of the present disclosure, the number of hops supported by the non-redcap UE is greater than the number of hops supported by the redcap UE.

In an embodiment of the present disclosure, the second determining module includes: a first unit for determining a number of hops of a non-redcap UE, configured to: if the UE is a non-redcap UE, take a first number of hops as a number of hops of the non-redcap UE; and a first unit for determining a number of hops of a redcap UE, configured to: if the UE is a redcap UE, take a second number of hops as a number of hops of the redcap UE, where the first number of hops is greater than the second number of hops.

In the embodiment of the present disclosure, the first number of hops and the second number of hops are configured by a protocol or indicated by a base station.

In the embodiment of the present disclosure, the first number of hops and second number of hops are indicated by a remaining minimum system information (RMSI), random access response (RAR), or downlink control information (DCI) from the base station.

In an embodiment of the present disclosure, the second determining module includes: a first determining module, configured to determine whether a BWP of a non-redcap UE is greater than a system bandwidth of a redcap UE; a second for determining a number of hops of a non-redcap UE, configured to: if greater than the system bandwidth of the redcap UE, take a first preset number as a number of hops of the non-redcap UE, and take a second preset number as a number of hops of the redcap UE, where the first preset number of hops is greater than the second preset number of hops; and a first unit for determining a number of hops of a non-redcap UE and a redcap UE, configured to: if less than or equal to a system bandwidth of the redcap UE, take the first preset number as the number of hops of the non-redcap UE and the redcap UE.

In an embodiment of the present disclosure, the second determining module includes: a first receiving indication number unit, configured to: receive a first indication number and a second indication number indicated by the base station, where the first indication number is greater than the second indication number; and a second unit for determining a number of hops of a non-redcap UE and a redcap UE, configured to: if a BWP of a non-redcap UE is greater than a system bandwidth of a redcap UE, take the first indication number as a number of hops of the non-redcap UE, and the second indication number as a number of hops of the redcap UE.

In an embodiment of the present disclosure, the second determining module includes: a second receiving indication number unit, configured to: receive a third indication number indicated by the base station; and a third unit for determining a number of hops of a non-redcap UE and a redcap UE, configured to: if a first BWP of the non-redcap UE is less than or equal to a second BWP of the redcap UE, take the third indication number as a number of hops of the non-redcap UE and the redcap UE.

In an embodiment of the present disclosure, the first indication number and second indication number, or third indication number are indicated by an RMSI, an RAR, or a DCI from the base station.

In an embodiment of the present disclosure, the number of hops corresponding to the non-redcap UE is indicated by the base station, or the number of hops corresponding to the redcap UE is specified by a protocol.

An embodiment of a fifth aspect of the present disclosure proposes a frequency hopping control apparatus, which is performed by a redcap UE, including: a third determining module, configured to confirm a position of a next hop of the redcap UE; a radio frequency retuning module, configured to perform radio frequency retuning if a frequency domain position of the next hop exceeds a frequency domain position where a current operating bandwidth of the redcap is located, such that an operating bandwidth of the redcap UE hops to a frequency domain position where the next hop is located.

In the embodiment of the present disclosure, a time interval for radio frequency retuning is specified by a protocol as a fixed value, or indicated by a base station.

In an embodiment of the present disclosure, the time interval is indicated by a system message, a media access control control element (MAC CE), or downlink control information (DCI) signaling.

An embodiment of a sixth aspect of the present disclosure proposes a frequency hopping control apparatus, which is performed by a base station, including:

- a fourth determining module, configured to determine a type of UE;
- a fifth determining module, configured to determine one or more frequency hopping parameters of the UE according to the type of the UE;
- a first providing module, configured to provide a frequency hopping service of the UE according to the determined frequency hopping parameters.

In an embodiment of the present disclosure, the frequency hopping parameter is a frequency hopping start position.

In an embodiment of the present disclosure, the fifth determining module is configured to: determining the UE being a redcap UE, determine an initial value of a frequency hopping start position of the UE; and determine the frequency hopping start position of the UE according to an initial value of the start frequency hopping of the UE.

In an embodiment of the present disclosure, the fifth determining module is configured to: determine a system bandwidth of the UE; determining the initial value of the frequency hopping start position exceeding the system bandwidth of the UE, acquire an adjustment value; and adjust the initial value of the frequency hopping start position according to the adjustment value to generate the frequency hopping start position of the UE.

In an embodiment of the present disclosure, the fifth determining module is configured to: determining the initial value of the frequency hopping start position not exceeding the system bandwidth of the UE, determine the initial value of the frequency hopping start position as the frequency hopping start position of the UE.

In an embodiment of the present disclosure, the adjustment value is determined by: a protocol; or, sending signaling to the UE for configuration.

In an embodiment of the present disclosure, the fifth determining module is configured to: determining the UE being a non-redcap UE, take the initial value of the frequency hopping start position as the frequency hopping start position of the UE.

In an embodiment of the present disclosure, the fifth determining module includes: a unit for acquiring a number of hops of the UE, configured to: acquire a current number of hops of the UE; a unit for generating a current frequency hopping start position of the UE, configured to generate a current frequency hopping start position of the UE according to the current number of hops; a generating unit, configured to: generate an adjustment coefficient according to the type of the UE; and a unit for generating a frequency hopping start position of the UE, configured to: generate the frequency hopping start position of the UE according to the adjustment coefficient and the current frequency hopping start position.

In an embodiment of the present disclosure, the generating unit is configured to: if the UE is a non-redcap UE, acquire a bandwidth part (BWP) of the non-redcap UE and generate the adjustment coefficient according to the BWP; and if the UE is a redcap UE, acquire a system bandwidth of the redcap UE and generate the adjustment coefficient according to the system bandwidth.

In an embodiment of the present disclosure, the generating unit is configured to: generate the adjustment coefficient according to a minimum value between the system bandwidth of the redcap and the BWP of the non-redcap UE.

In an embodiment of the present disclosure, the generating unit is configured to: generate the adjustment coefficient according to a minimum value between a BWP of a non-redcap UE and a system bandwidth of a redcap UE, where frequency hopping start positions of the non-redcap UE and the redcap UE are both generated by the adjustment coefficient.

In an embodiment of the present disclosure, the one or more frequency hopping parameters include frequency hopping offsets.

In an embodiment of the present disclosure, the fifth determining module includes: a first sending unit, configured to: send an offset configuration table corresponding to the type of the UE to the UE; and a second sending unit, configured to: send an offset identification to the UE.

In an embodiment of the present disclosure, further including: a unit for determining a first offset configuration table corresponding to a non-redcap UE, configured to: if the UE is a non-redcap UE, determine frequency hopping offsets in a first offset configuration table corresponding to the non-redcap UE according to a BWP of the non-redcap UE; and a unit for determining a second offset configuration table corresponding to a UE, configured to: if the UE is a redcap UE, determine frequency hopping offsets in a second offset configuration table corresponding to the redcap UE according to a system bandwidth of the redcap UE.

In an embodiment of the present disclosure, the frequency hopping offsets in the second offset configuration table are determined according to a minimum value between the system bandwidth of the redcap and the BWP of the non-redcap UE.

In an embodiment of the present disclosure, the offset configuration table is determined by: a protocol; or, sending signaling to the UE for configuration.

In an embodiment of the present disclosure, both the non-redcap UE and the redcap UE can use the second offset configuration table.

In an embodiment of the present disclosure, in the offset configuration table, frequency hopping offsets corresponding to a non-redcap UE are determined by a BWP of the non-redcap UE, and frequency hopping offsets corresponding to a redcap UE are determined by a minimum value between the BWP of the non-redcap UE and a system bandwidth of the redcap UE.

In an embodiment of the present disclosure, the one or more frequency hopping parameters include a number of hops.

In an embodiment of the present disclosure, the number of hops supported by the non-redcap UE is greater than the number of hops supported by the redcap UE.

In an embodiment of the present disclosure, the fifth determining module includes: a third unit for determining a number of hops of a non-redcap UE, configured to: if the UE is a non-redcap UE, take a first number of hops as a number of hops of the non-redcap UE; and a second unit for determining a number of hops of a redcap UE, configured to: if the UE is a redcap UE, take a second number of hops as a number of hops of the redcap UE, where the first number of hops is greater than the second number of hops.

In the embodiment of the present disclosure, the first number of hops and the second number of hops are configured by a protocol or indicated by a base station.

In the embodiment of the present disclosure, the first number of hops and second number of hops are indicated by a remaining minimum system information (RMSI), random access response (RAR), or downlink control information (DCI) from the base station.

In an embodiment of the present disclosure, the fifth determining module includes: a second determining module, configured to determine whether a BWP of a non-redcap UE is greater than a system bandwidth of a redcap UE; a fourth for determining a number of hops of a non-redcap UE, configured to: if greater than the system bandwidth of the redcap UE, take a first preset number as a number of hops of the non-redcap UE, and take a second preset number as a number of hops of the redcap UE, where the first preset number of hops is greater than the second preset number of hops; and a fourth unit for determining a number of hops of a non-redcap UE and a redcap UE, configured to: if less than or equal to a system bandwidth of the redcap UE, take the first preset number as the number of hops of the non-redcap UE and the redcap UE.

In an embodiment of the present disclosure, the fifth determining module includes: a third sending unit, configured to: send a first indication number and a second indication number, where the first indication number is greater than the second indication number; where, if a BWP of a non-redcap UE is greater than a system bandwidth of a redcap UE, take the first indication number as a number of hops of the non-redcap UE, and take the second indication number as a number of hops of the redcap UE.

In an embodiment of the present disclosure, the fifth determining module includes: a fourth sending unit, configured to: send a third indication number, where if a first BWP of the non-redcap UE is less than or equal to a second BWP of the redcap UE, taking the third indication number as a number of hops of the non-redcap UE and the redcap UE.

In an embodiment of the present disclosure, the first indication number and second indication number, or third indication number are indicated by an RMSI, an RAR, or a DCI from the base station.

In an embodiment of the present disclosure, the number of hops corresponding to the non-redcap UE is indicated by the base station, and the number of hops corresponding to the redcap UE is specified by a protocol.

An embodiment of a seventh aspect of the present disclosure provides a communication device, including: a transceiver; a memory; a processor, connected to the transceiver and the memory, respectively, and configured to control radio signal transmission and reception of the transceiver by executing computer-executable instructions on the memory, and realize the frequency hopping control method proposed in the embodiment of the first aspect, the frequency hopping control method proposed in the second aspect or the frequency hopping control method proposed in the third aspect.

An embodiment of an eighth aspect of the present disclosure proposes a processor-readable storage medium, which stores a computer program for causing the processor to execute the frequency hopping control method proposed in the embodiment of the first aspect, the frequency hopping control method proposed in the embodiment of the second aspect or the frequency hopping control method proposed in the third aspect.

A frequency hopping control method and apparatus is provided by the embodiment of the present disclosure, which determines a type of a UE; determines one or more frequency hopping parameters according to the type of the UE; and performs frequency hopping according to the determined frequency hopping parameters. Therefore, the frequency hopping parameters can be adjusted according to the type of the UE, thereby avoiding a situation of hopping out of a system bandwidth range of a redcap UE.

It should be understood that steps can be reordered, added or deleted using the various forms of flow shown above. For example, the steps described in the present application can be executed in parallel, in sequence, or in different orders. As long as the desired results of the technical solution disclosed in the present disclosure can be achieved, there is no restriction here.

The above specific embodiments do not limit the protection scope of the present disclosure. Those skilled in the art should understand that various modifications, combinations, sub-combinations and substitutions can be made according to design requirements and other factors. Any modification, equivalent substitution and improvement made within the spirit and principles of the present disclosure should be included in the protection scope of the present disclosure.

The invention claimed is:

1. A frequency hopping method, performed by a user equipment (UE), comprising:

determining a type of the UE, wherein the type of the UE comprises a non-reduced capability UE (non-redcap UE), or a reduced capability UE (redcap UE);

determining one or more frequency hopping parameters according to the type of the UE; and performing frequency hopping according to the one or more frequency hopping parameters;

wherein the one or more frequency hopping parameters comprise a frequency hopping start position, and determining the one or more frequency hopping parameters according to the type of the UE comprises:

determining a current number of hops;

generating a current frequency hopping start position of the UE according to the current number of hops;

generating an adjustment coefficient according to the type of the UE; and generating the frequency hopping start position according to the adjustment coefficient and the current frequency hopping start position of the UE.

2. The method according to claim 1, wherein determining the one or more frequency hopping parameters according to the type of the UE comprises:

determining that the UE is the redcap UE;

determining an initial value of a frequency hopping start position of the UE; and determining the frequency hopping start position according to the initial value of the frequency hopping start position of the UE.

3. The method according to claim 1, wherein the one or more frequency hopping parameters further comprise a frequency hopping offset, wherein determining the one or more frequency hopping parameters according to the type of the UE comprises:

acquiring an offset configuration table corresponding to the type of the UE;

acquiring an offset identification indicated by a base station; and determining the frequency hopping offset according to the offset identification and the offset configuration table corresponding to the type of the UE.

4. The method according to claim 1, wherein the one or more frequency hopping parameters further comprise a number of hops, and a number of hops supported by the non-redcap UE is greater than a number of hops supported by the redcap UE; and wherein determining the one or more frequency hopping parameters according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE, wherein the first number of hops is greater than the second number of hops.

5. The method according to claim 1, wherein generating the adjustment coefficient according to the type of the UE comprises:

in case of determining that the UE is the non-redcap UE, acquiring a bandwidth part (BWP) of the non-redcap UE and generating the adjustment coefficient according to the BWP of the non-redcap UE; or in case of determining that the UE is the redcap UE, acquiring a bandwidth (BW) of the redcap UE and generating the adjustment coefficient according to the BW of the redcap UE.

6. A communication device, comprising:

a transceiver;

a memory; and a processor, connected to the transceiver and the memory, respectively, and configured to control radio signal transmission and reception of the transceiver by executing computer-executable instructions on the memory, and realizes the method, comprising:

determining a type of a user equipment (UE), wherein the type of the UE comprises a non-reduced capability UE (non-redcap UE), or a reduced capability UE (redcap UE);

determining one or more frequency hopping parameters according to the type of the UE; and performing frequency hopping according to the one or more frequency hopping parameters;

wherein the one or more frequency hopping parameters comprise a frequency hopping start position, and determining the one or more frequency hopping parameters according to the type of the UE comprises:

determining a current number of hops;

generating a current frequency hopping start position of the UE according to the current number of hops;

generating an adjustment coefficient according to the type of the UE; and generating the frequency hopping start position according to the adjustment coefficient and the current frequency hopping start position of the UE.

7. A frequency hopping control method, performed by a base station, comprising:

determining a type of a user equipment (UE), wherein the type of the UE comprises a non-reduced capability UE (non-redcap UE), or a reduced capability UE (redcap UE);

determining one or more frequency hopping parameters of the UE according to the type of the UE; and providing a frequency hopping service for the UE according to the one or more frequency hopping parameters of the UE;

wherein the one or more frequency hopping parameters comprise a frequency hopping start position, and determining the one or more frequency hopping parameters of the UE according to the type of the UE comprises:

acquiring a current number of hops of the UE;

generating a current frequency hopping start position of the UE according to the current number of hops;

generating an adjustment coefficient according to the type of the UE; and generating the frequency hopping start position of the UE according to the adjustment coefficient and the current frequency hopping start position.

8. The method according to claim 7, wherein determining the one or more frequency hopping parameters of the UE according to the type of the UE comprises:

determining that the UE is the redcap UE;

determining an initial value of the frequency hopping start position of the UE; and determining the frequency hopping start position of the UE according to the initial value of the frequency hopping start position of the UE.

9. The method according to claim 7, wherein the one or more frequency hopping parameters comprise frequency hopping offsets, wherein determining the one or more frequency hopping parameters of the UE according to the type of the UE comprises:

sending an offset configuration table corresponding to the type of the UE to the UE; and sending an offset identification to the UE.

10. The method according to claim 7, wherein the one or more frequency hopping parameters comprise a number of hops, and a number of hops supported by the non-redcap UE is greater than a number of hops supported by the redcap UE;

wherein determining the one or more frequency hopping parameters of the UE according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE, wherein the first number of hops is greater than the second number of hops.

11. The method according to claim 7, wherein generating the adjustment coefficient according to the type of the UE comprises:

in case of determining that the UE is the non-redcap UE, acquiring a bandwidth part (BWP) of the non-redcap UE and generating the adjustment coefficient according to the BWP of the non-redcap UE; or p1 in case of determining that the UE is the redcap UE, acquiring a bandwidth (BW) of the redcap UE and generating the adjustment coefficient according to the BW of the redcap UE.

12. A frequency hopping method, performed by a user equipment (UE), comprising:

determining a type of the UE, wherein the type of the UE comprises a non-reduced capability UE (non-redcap UE), or a reduced capability UE (redcap UE);

determining one or more frequency hopping parameters according to the type of the UE; and performing frequency hopping according to the one or more frequency hopping parameters;

wherein the one or more frequency hopping parameters comprise a frequency hopping offset, and determining the one or more frequency hopping parameters according to the type of the UE comprises:

acquiring an offset configuration table corresponding to the type of the UE;

acquiring an offset identification indicated by a base station; and determining the frequency hopping offset according to the offset identification and the offset configuration table corresponding to the type of the UE.

13. The method according to claim 12, wherein the one or more frequency hopping parameters further comprise a frequency hopping start position, wherein determining the one or more frequency hopping parameters according to the type of the UE comprises:

determining that the UE is the redcap UE;

determining an initial value of a frequency hopping start position of the UE; and determining the frequency hopping start position according to the initial value of the frequency hopping start position of the UE.

14. The method according to claim 12, wherein the one or more frequency hopping parameters further comprise a frequency hopping start position, wherein determining the one or more frequency hopping parameters according to the type of the UE comprises:

determining a current number of hops;

generating a current frequency hopping start position of the UE according to the current number of hops;

generating an adjustment coefficient according to the type of the UE; and generating the frequency hopping start position according to the adjustment coefficient and the current frequency hopping start position of the UE.

15. The method according to claim 12, wherein the one or more frequency hopping parameters further comprise a number of hops, and a number of hops supported by the non-redcap UE is greater than a number of hops supported by the redcap UE; and wherein determining the one or more frequency hopping parameters according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE, wherein the first number of hops is greater than the second number of hops.

16. A communication device, comprising:

a transceiver;

a memory; and a processor, connected to the transceiver and the memory, respectively, and configured to control radio signal transmission and reception of the transceiver by executing computer-executable instructions on the memory, and realizes the method, comprising:

determining a type of a user equipment (UE), wherein the type of the UE comprises a non-reduced capability UE (non-redcap UE), or a reduced capability UE (redcap UE);

determining one or more frequency hopping parameters according to the type of the UE; and performing frequency hopping according to the one or more frequency hopping parameters;

wherein the one or more frequency hopping parameters comprise a frequency hopping offset, and determining the one or more frequency hopping parameters according to the type of the UE comprises:

acquiring an offset configuration table corresponding to the type of the UE;

acquiring an offset identification indicated by a base station; and determining the frequency hopping offset according to the offset identification and the offset configuration table corresponding to the type of the UE.

17. A frequency hopping method, performed by a user equipment (UE), comprising:

determining a type of the UE, wherein the type of the UE comprises a non-reduced capability UE (non-redcap UE), or a reduced capability UE (redcap UE);

determining one or more frequency hopping parameters according to the type of the UE; and performing frequency hopping according to the one or more frequency hopping parameters;

wherein the one or more frequency hopping parameters comprise a number of hops, and determining the one or more frequency hopping parameters according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE;

wherein the first number of hops is greater than the second number of hops.

18. The method according to claim 17, wherein the one or more frequency hopping parameters further comprise a frequency hopping start position, wherein determining the one or more frequency hopping parameters according to the type of the UE comprises:

determining that the UE is the redcap UE;

determining an initial value of a frequency hopping start position of the UE; and determining the frequency hopping start position according to the initial value of the frequency hopping start position of the UE.

19. The method according to claim 17, wherein the one or more frequency hopping parameters further comprise a frequency hopping start position, wherein determining the one or more frequency hopping parameters according to the type of the UE comprises:

determining a current number of hops;

generating a current frequency hopping start position of the UE according to the current number of hops;

generating an adjustment coefficient according to the type of the UE; and generating the frequency hopping start position according to the adjustment coefficient and the current frequency hopping start position of the UE.

20. The method according to claim 17, wherein the one or more frequency hopping parameters further comprise a frequency hopping offset, wherein determining the one or more frequency hopping parameters according to the type of the UE comprises:

acquiring an offset configuration table corresponding to the type of the UE;

acquiring an offset identification indicated by a base station; and determining the frequency hopping offset according to the offset identification and the offset configuration table corresponding to the type of the UE.

21. A communication device, comprising:

a transceiver;

a memory; and a processor, connected to the transceiver and the memory, respectively, and configured to control radio signal transmission and reception of the transceiver by executing computer-executable instructions on the memory, and realizes the method, comprising:

determining a type of a user equipment (UE), wherein the type of the UE comprises a non-reduced capability UE (non-redcap UE), or a reduced capability UE (redcap UE);

determining one or more frequency hopping parameters according to the type of the UE; and performing frequency hopping according to the one or more frequency hopping parameters;

wherein the one or more frequency hopping parameters comprise a number of hops, and determining the one or more frequency hopping parameters according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE;

wherein the first number of hops is greater than the second number of hops.

22. A frequency hopping control method, performed by a base station, comprising:

determining a type of a user equipment (UE), wherein the type of the UE comprises a non-reduced capability UE (non-redcap UE), or a reduced capability UE (redcap UE);

determining one or more frequency hopping parameters of the UE according to the type of the UE; and providing a frequency hopping service for the UE according to the one or more frequency hopping parameters of the UE;

wherein the one or more frequency hopping parameters comprise a frequency hopping offset, and determining the one or more frequency hopping parameters of the UE according to the type of the UE comprises:

sending an offset configuration table corresponding to the type of the UE to the UE; and sending an offset identification to the UE.

23. The method according to claim 22, wherein the one or more frequency hopping parameters further comprise a frequency hopping start position, wherein determining the one or more frequency hopping parameters of the UE according to the type of the UE comprises:

determining that the UE is the redcap UE;

determining an initial value of a frequency hopping start position of the UE; and determining the frequency hopping start position according to the initial value of the frequency hopping start position of the UE.

24. The method according to claim 22, wherein the one or more frequency hopping parameters further comprise a frequency hopping start position, wherein determining the one or more frequency hopping parameters of the UE according to the type of the UE comprises:

acquiring a current number of hops of the UE;

generating a current frequency hopping start position of the UE according to the current number of hops;

generating an adjustment coefficient according to the type of the UE; and generating the frequency hopping start position of the UE according to the adjustment coefficient and the current frequency hopping start position.

25. The method according to claim 22, wherein the one or more frequency hopping parameters further comprise a number of hops, and a number of hops supported by the non-redcap UE is greater than a number of hops supported by the redcap UE; and wherein determining the one or more frequency hopping parameters according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE, wherein the first number of hops is greater than the second number of hops.

26. A frequency hopping control method, performed by a base station, comprising:

determining a type of a user equipment (UE), wherein the type of the UE comprises a non-reduced capability UE (non-redcap UE), or a reduced capability UE (redcap UE);

determining one or more frequency hopping parameters of the UE according to the type of the UE; and providing a frequency hopping service for the UE according to the one or more frequency hopping parameters of the UE;

wherein the one or more frequency hopping parameters comprise a number of hops, and determining the one or more frequency hopping parameters of the UE according to the type of the UE comprises:

in case of determining that the UE is the non-redcap UE, determining a first number of hops as a number of hops of the non-redcap UE; or in case of determining that the UE is the redcap UE, determining a second number of hops as a number of hops of the redcap UE;

wherein the first number of hops is greater than the second number of hops.

27. The method according to claim 26, wherein the one or more frequency hopping parameters further comprise a frequency hopping start position, wherein determining the one or more frequency hopping parameters of the UE according to the type of the UE comprises:

determining that the UE is the redcap UE;

determining an initial value of a frequency hopping start position of the UE; and determining the frequency hopping start position according to the initial value of the frequency hopping start position of the UE.

28. The method according to claim 26, wherein the one or more frequency hopping parameters further comprise a frequency hopping start position, wherein determining the one or more frequency hopping parameters of the UE according to the type of the UE comprises:

acquiring a current number of hops of the UE;

generating a current frequency hopping start position of the UE according to the current number of hops;

generating an adjustment coefficient according to the type of the UE; and generating the frequency hopping start position of the UE according to the adjustment coefficient and the current frequency hopping start position.

29. The method according to claim 26, wherein the one or more frequency hopping parameters further comprise a frequency hopping offset, wherein determining the one or more frequency hopping parameters of the UE according to the type of the UE comprises:

sending an offset configuration table corresponding to the type of the UE to the UE; and sending an offset identification to the UE.

* * * * *